US007122591B2

(12) United States Patent
Saito et al.

(10) Patent No.: US 7,122,591 B2
(45) Date of Patent: Oct. 17, 2006

(54) POLYPHENYLENE ETHER-BASED RESIN COMPOSITION CONTAINING SILICON COMPOUND

(75) Inventors: Hideo Saito, Shizuoka (JP); Masanori Ikeda, Shizuoka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/470,052

(22) PCT Filed: Jan. 23, 2002

(86) PCT No.: PCT/JP02/00472

§ 371 (c)(1),
(2), (4) Date: Jul. 24, 2003

(87) PCT Pub. No.: WO02/059208

PCT Pub. Date: Aug. 1, 2002

(65) Prior Publication Data

US 2004/0138355 A1    Jul. 15, 2004

(30) Foreign Application Priority Data

Jan. 24, 2001 (JP) ............................. 2001-015237
Sep. 21, 2001 (JP) ............................. 2001-289244

(51) Int. Cl.
*C08K 5/5419* (2006.01)

(52) U.S. Cl. ...................... 524/261; 524/262; 524/263; 524/264; 524/267

(58) Field of Classification Search ........ 524/261–264, 524/267
See application file for complete search history.

(56) References Cited

U.S. PATENT DOCUMENTS 5,169,887 A    12/1992  Snow et al.

FOREIGN PATENT DOCUMENTS

| DE | 199 47 832 A1 | 4/2000 |
|----|---------------|--------|
| EP | 0 369 376 A2  | 5/1990 |
| JP | 05-086295 A   | 4/1993 |
| JP | 0 952 482 A1  | 10/1999 |
| JP | 2000-178436 A | 6/2000 |
| JP | 2000-334881 A | 12/2000 |
| JP | 2001-181639 A | 7/2001 |
| JP | 2001-189109 A | 7/2001 |
| JP | 2001-200164 A | 7/2001 |
| JP | 2001-294743 A | 10/2001 |
| JP | 2001-323152 A | 11/2001 |
| JP | 2001-323153 A | 11/2001 |

OTHER PUBLICATIONS

Office Action issued in corresponding German aplication on Jun. 15, 2005; with English translation.

*Primary Examiner*—Peter Szekely
(74) *Attorney, Agent, or Firm*—Birch, Stewart, Kolasch & Birch, LLP

(57) ABSTRACT

The present invention relates to a polyphenylene ether-based resin composition comprising a polyphenylene ether-based resin and at least one member selected from cage silsesquioxanes and partially cleaved structures of cage silsesquioxanes. The polyphenylene ether-based resin composition of the invention is excellent in heat resistance, mechanical properties, moldability and flame resistance.

28 Claims, No Drawings

POLYPHENYLENE ETHER-BASED RESIN COMPOSITION CONTAINING SILICON COMPOUND

This application is the national phase under 35 U.S.C. § 371 of PCT International Application No. PCT/JP02/00472 which has an International filing date of Jan. 23, 2002, which designated the United States of America.

TECHNICAL FIELD

The present invention relates to a polyphenylene ether-based resin composition. More specifically, it relates to a polyphenylene ether-based resin composition excellent in moldability and flame resistance, which contains a cage silsesquioxane and/or a partially cleaved structure thereof.

BACKGROUND ART

Since polyphenylene ether-based resins have a light-weight and are excellent in impact resistance as compared with metal or glass, the resins have been employed in a variety of fields including automobile parts, household electric appliance parts, and office automation equipment parts. However, since polyphenylene ether resins have a bad moldability, the resins are used not singly but as a mixture with a polystyrene-based resin which is completely compatible. However, the incorporation of the polystyrene-based resin which is more flammable than the polyphenylene ether-based resins lowers the heat-resistant temperature of the mixed resin of polyphenylene ether/polystyrene, and also makes the resin flammable. Therefore, a novel method that enables molding a polyphenylene ether-based resin without incorporating polystyrene has been desired. Moreover, it has been also desired to develop a method of achieving both moldability and flame resistance at the same time.

As methods for imparting flame resistance to polyphenylene ether-based resins, there have been known methods of adding a halogen-based, phosphorus-based, inorganic or a mixed retardant thereof, and thereby flame resistance has been imparted to some extent. Recently, however, a request for safety against fire has become particularly important and, at the same time, it has been strongly desired to develop a technology having no environmental problems. Therefore, it has been currently desired to develop a novel non-halogen or non-phosphorus flame retardant which exhibits a high flame-retarding effect and does not deteriorate practical performance such as mechanical properties of resin compositions. An organic silicon-based flame retardant is proposed as a flame retardant which possibly satisfies these requirements. As examples thereof, a flame-resistant resin compositions containing a polyphenylene ether-based resin composition and dimethylsilicone are disclosed in JP-B-63-10184, JP-A-64-4656, U.S. Pat. Nos. 4,497,925 and 4,387,176, and JP-A-2-133464. However, the silicone in the above publications has a low compatibility with polyphenylene ether-based resins and a low moldability. Moreover, the silicone cannot withstand practical use owing to its volatility.

In consideration of such situation, it is an object of the invention to provide a polyphenylene ether-based resin composition having none of the aforementioned problems, i.e., having an excellent melt flowability and flame resistance and a high heat resistance.

DISCLOSURE OF THE INVENTION

As a result of extensive studies for solving the above problems, the present inventors have found that melt flowability and flame resistance of the resin composition are remarkably enhanced at the same time by mixing a specific cage silsesquioxane compound and/or partially cleaved structure thereof with a polyphenylene ether-based resin, and they have accomplished the invention. Among them, it is noteworthy that the incorporation of a small amount of the specific cage silsesquioxane compound and/or partially cleaved structure thereof improves the properties of the polyphenylene ether-based resin to a large extent and hence a far smaller amount of a modifier to be added is sufficient as compared with the case of a polyphenylene ether/polystyrene-based polymer alloy or the like. Therefore, it is confirmed that melt flowability and flame resistance are improved while hardly impairing the high heat resistance and excellent mechanical properties intrinsic to the polyphenylene ether resin in the polyphenylene ether-based resin composition of the invention. The above characteristics of the composition of the invention are industrially very important and are first confirmed by the inventors of the present application.

In this connection, the inventors have widely investigated the effect of incorporating a variety of cage silsesquioxane compounds and partially cleaved structure thereof into various polymers. As a result, no flame resistance-improving effect was observed in the cases of polybutylene terephthalate (PBT) (an aromatic condensation polymer), Nylon-66 (an aliphatic condensation polymer), and the like. Therefore, the industrially important finding that the above flame resistance-enhancing effect and melt moldability-enhancing effect of the invention are exhibited at the same time even by a small amount of the additive is an innovative finding which was first found by the inventors through the combination of a specific cage silsesquioxane compound and/or partially cleaved structure thereof with a polyphenylene ether-based resin.

Namely, the invention relates to the following.

(1) A polyphenylene ether-based resin composition comprising a polyphenylene ether-based resin and at least one of a cage silsesquioxane and a partially cleaved structure of a cage silsesquioxane.

(2) The polyphenylene ether-based resin composition described in the above (1), wherein the cage silsesquioxane is a compound represented by the general formula (A) and the partially cleaved structure of the cage silsesquioxane is a compound represented by the general formula (B):

  (A)

  (B)

wherein, in the general formulae (A) and (B), R is selected from a hydrogen atom, an alkoxyl group having 1 to 6 carbon atoms, an aryloxy group, a substituted or unsubstituted hydrocarbon group having 1 to 20 carbon atoms, and a silicon atom-containing group having 1 to 10 silicon atoms, and a plurality of R's may be the same or different; in the general formula (B), X is a group selected from OR$_1$ (R$_1$ is a hydrogen atom, an alkyl group, an aryl group, a quaternary ammonium radical), halogen atom and groups defined in the above R, and a plurality of X's may be the same or different or a plurality of X's in (RXSiO)$_k$ may be connected to each other to form a connected structure; and n is an integer of 6 to 14, l is an integer of 2 to 12, and k is 2 or 3.

(3) The polyphenylene ether-based resin composition described in the above (2), wherein the connected structure in the general formula (B) is a connected structure represented by the general formula (1):

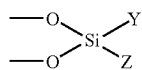

General formula (1)

wherein Y and Z are selected from the group consisting of the same groups as those for X, and Y and Z may be the same or different.

(4) The polyphenylene ether-based resin composition described in the above (2) or (3), wherein the compounds of the general formulae (A) and (B) have a ratio of "the number of R, X, Y, and Z which are aromatic hydrocarbon groups" to "the number of all of R, X, Y, and Z" of 93% or less.

(5) The polyphenylene ether-based resin composition described in any one of the above (2) to (4), wherein at least one of R, X, Y, and Z in the general formulae (A) and (B) is 1) a group containing an unsaturated hydrocarbon bond or 2) a group having a polar group containing at least one of a nitrogen atom and an oxygen atom.

(6) The polyphenylene ether-based resin composition described in the above (3) or (5), wherein the compound of the general formula (B) is a compound represented by the following general formula (B-1):

$$(RSiO_{3/2})_l(RX_{a1}SiO)(Rx_{a2}SiO)(Rx_bSiO) \quad (B-1)$$

wherein, in the general formula (B-1), R and l are the same as in the case of the general formula (B); $X_{a1}$ and $X_{a2}$ are selected from the group consisting of the same groups as those for X in the general formula (B) and $X_{a1}$ and $X_{a2}$ may be connected to each other to form a connected structure represented by the general formula (1-1):

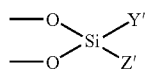

General formula (1-1)

wherein $X_b$ is a group selected from a hydroxyl group and —OSi(OH)Y"Z"; Y', Z', Y" and Z" are selected from the group consisting of the same groups as those for X in the general formula (B); provided that at least one of $X_{a1}$, $X_{a2}$, $X_b$, Y', Z', Y" and Z" in the same compound is 1) a group containing an unsaturated hydrocarbon bond or 2) a group having a polar group containing a nitrogen atom and/or an oxygen atom and $X_{a1}$, $X_{a2}$, $X_b$, Y', Z', Y" and Z" may be the same or different from each other.

(7) The polyphenylene ether-based resin composition described in the above (6), wherein at least one of $X_{a1}$, $X_{a2}$, $X_b$, Y', Z', Y" and Z" in the compound of the general formula (B-1) is a group containing an amino group.

(8) A compound represented by the following general formula (B-1):

$$(RSiO_{3/2})_l(RX_{a1}SiO)(Rx_{a2}SiO)(RX_bSiO) \quad (B-1)$$

wherein, in the general formula (B-1), R is selected from a hydrogen atom, an alkoxyl group having 1 to 6 carbon atoms, an aryloxy group, a substituted or unsubstituted hydrocarbon group having 1 to 20 carbon atoms, and a silicon atom-containing group having 1 to 10 silicon atoms, and a plurality of R's may be the same or different; l is an integer of 2 to 12; $X_{a1}$ and $X_{a2}$ are selected from the group consisting of the same groups as those for X in the general formula (B) and $X_{a1}$ and $X_{a2}$ may be connected to each other to form a connected structure represented by the general formula (1-1):

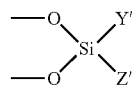

General formula (1-1)

wherein $X_b$ is a group selected from a hydroxyl group and —OSi(OH)Y"Z"; Y', Z', Y" and Z" each is a group selected from $OR_1$ ($R_1$ is a hydrogen atom, an alkyl group, an aryl group, a quaternary ammonium radical), halogen atom and groups defined in the above R; provided that at least one Of $X_{a1}$, $X_{a2}$, $X_b$, Y', Z', Y" and Z" in the same compound is a group having a polar group containing an amino group and $X_{a1}$, $X_{a2}$, $X_b$, Y', Z', Y" and Z" are the same or different from each other.

(9) The polyphenylene ether-based resin composition described in any one of the above (1) to (7), wherein the content of the cage silsesquioxane and the partially cleaved structure of the cage silsesquioxane is from 0.1% by weight to 90% by weight in total.

(10) The polyphenylene ether-based resin composition described in any one of the above (1) to (7) and (9), wherein the polyphenylene ether-based resin is composed solely of a polyphenylene ether resin.

(11) The polyphenylene ether-based resin composition described in any one of the above (1) to (7) and (9), wherein the polyphenylene ether-based resin is a polymer alloy of a polyphenylene ether resin and at least one other resin.

(12) The polyphenylene ether-based resin composition described in the above (11), wherein the polyphenylene ether-based resin is a polymer alloy containing a polyphenylene ether resin and at least one resin selected from a polystyrene-based resin, a polyamide-based resin, a polyester-based resin, a polyolefin-based resin, and a polyether sulfone-based resin.

(13) The polyphenylene ether-based resin composition described in the above (11) or (12), wherein the content of the polyphenylene ether resin in the polymer alloy is 40% by weight or more.

(14) The polyphenylene ether-based resin composition described in any one of the above (1) to (7) and (9) to (13), which further contains a cyclic nitrogen compound.

(15) A process for producing a molded article of a polyphenylene ether-based resin composition, comprising melt-molding a polyphenylene ether-based resin composition described in any one of the above (1) to (7) and (9) to (14).

(16) A molded article of the polyphenylene ether-based resin composition described in any one of the above (1) to (7) and (9) to (14).

BEST MODE FOR CARRYING OUT THE INVENTION

The following will describe the invention in detail.

The "polyphenylene ether-based resin composition comprising a polyphenylene ether-based resin and at least one of a cage silsesquioxane and a partially cleaved structure of the cage silsesquioxane" of the invention means a composition containing "at least one of a cage silsesquioxane and a partially cleaved structure of the cage silsesquioxane" and a "polyphenylene ether-based resin" as essential constituents. The "polyphenylene ether-based resin" for use in the invention means a "polyphenylene ether resin and polymer alloy containing the same". The "polyphenylene ether resin" for use in the invention means a homopolymer composed of a repeating unit of the following general formula (2), a copolymer containing a repeating unit of the following general formula (2), or a modified polymer thereof.

General formula (2):

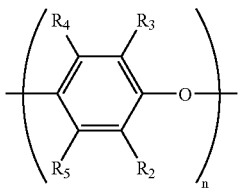

wherein $R_2$, $R_3$, $R_4$, and $R_5$ each represents hydrogen, primary or secondary lower alkyl, phenyl, aminoalkyl, or hydrocarbon-oxy.

As the polyphenylene ether resin, a polymer having a wide range of molecular weight is usable but a homopolymer and/or copolymer having a reduced viscosity (0.5 g/dl, chloroform solution, measured at 30° C.) in the range of preferably 0.15 to 1.0 dl/g is used, the reduced viscosity being more preferably in the range of 0.20 to 0.70 dl/g, most preferably in the range of 0.40 to 0.60.

Representative Examples of the polyphenylene ether homopolymers include poly(1,4-phenylene)ether, poly(2,6-dimethyl-1,4-phenylene)ether, poly(2,5-dimethyl-1,4-phenylene)ether, poly(2-methyl-6-ethyl-1,4-phenylene)ether, poly(2,6-diethyl-1,4-phenylene)ether, poly(2,6-diphenyl-1,4-phenylene)ether, poly(2,3,6-trimethyl-1,4-phenylene)ether, and the like. Of these, particularly preferred is poly(2,6-dimethyl-1,4-phenylene)ether. Examples of the polyphenylene ether copolymers include copolymers of 2,6-dimethylphenol and the other phenol (e.g., 2,3,6-trimethylphenol, 2,6-diphenylphenol or 2-methylphenol (o-cresol)) and the like. Among the above various polyphenylene ether resins, preferred are poly(2,6-dimethyl-1,4-phenylene)ether, a copolymer of 2,6-dimethylphenol and 2,3,6-trimethylphenol and particularly preferred is poly(2,6-dimethyl-1,4-phenylene)ether.

An example of the process for producing a polyphenylene ether resin for use in the invention includes a method of oxidative polymerization of 2,6-xylenol using a complex of a cuprous salt with an amine described in U.S. Pat. No. 3,306,874 as a catalyst.

Processes described in U.S. Pat. Nos. 3,306,875, 3,257,357 and 3,257,358, JP-B-52-17880, and JP-A-50-51197 and JP-A-63-152628 are also preferred as processes for producing a polyphenylene ether resin.

The polyphenylene ether resin of the invention may be used as a powder after the polymerization step as it is, or may be used as pellets obtained by melt-kneading using an extruder or the like under a nitrogen gas atmosphere or non-nitrogen gas atmosphere, under a degassed or non-degassed condition.

The polyphenylene ether resin of the invention also includes a polyphenylene ether modified with a dienophile compound. Various dienophile compounds may be used for the modification treatment, but examples of the dienophile compounds include maleic anhydride, maleic acid, fumaric acid, phenylmaleimide, itaconic acid, acrylic acid, methacrylic acid, methyl arylate, methyl methacrylate, glycidyl acrylate, glycidyl methacrylate, stearyl acrylate, styrene and the like compounds. Furthermore, as a method for modification with these dienophile compounds, a polyphenylene ether may be functionalized in a melted state under a degassed or non-degassed condition using an extruder or the like in the presence or absence of a radical generator. Alternatively, it may be functionalized in a non-melted state, i.e., in the temperature range of room temperature to melting point in the presence or absence of a radical generator. At that time, melting point of the polyphenylene ether is defined as a peak top temperature of a peak observed in a temperature-heat flow graph obtained at a temperature elevation rate of 20° C./minute in the measurement on a differential scanning calorimeter. In the case that two or more peak top temperatures are present, it is defined as a maximum temperature thereof.

The polyphenylene ether-based resin of the invention may be the above polyphenylene ether resin alone or a polymer alloy of the above polyphenylene ether resin with the other resin. Examples of the other resin in this case include polystyrene-based resins such as atactic polystyrene, syndiotactic polystyrene, high impact polystyrene, an acrylonitrile-styrene copolymer, and the like; polyamide-based resins such as Nylon 6,6 and Nylon 6; polyester-based resins such as polyethylene terephthalate, polytriethylene terephthalate, and polybutylene terephthalate; polyolefin-based resins such as polyethylene and polypropylene; polyether sulfone-based resins; and the like. The polymer alloy containing the polyphenylene ether resin for use in the invention may be a polymer alloy obtainable by combining the polyphenylene ether resin and any one resin selected from polystyrene-based resins, polyamide-based resins, polyester-based resins, polyolefin-based resins, polyether sulfone-based resins, and the like, or a polymer alloy obtainable by combining the polyphenylene ether resin and two or more, plural resins.

In the case that a polymer alloy of the polyphenylene ether resin and a resin selected from polystyrene-based resins, polyamide-based resins, polyester-based resins, polyolefin-based resins, polyether sulfone-based resins, the content of the polyphenylene ether resin is preferably 40% by weight or more, more preferably 60% by weight or more, particularly preferably 80% by weight or more based on the total amount of the polyphenylene ether resin and the resin selected from polystyrene-based resins, polyamide-based resins, polyester-based resins, polyolefin-based resins, polyether sulfone-based resins.

In this connection, the content of the polyphenylene ether resin is preferably 35% by weight or more, more preferably 70% by weight or more, particularly preferably 90% by weight or more based on the total amount of the polyphenylene ether-based resin composition of the invention.

The following will describe the cage silsesquioxane and partially cleaved structure thereof for use in the invention.

While silica is represented by $SiO_2$, a silsesquioxane is a compound represented by $[R'SiO_{3/2}]$. The silsesquioxane is a polysiloxane usually synthesized by hydrolysis-polycondensation of an $R'SiX_3$ ($R'$=a hydrogen atom, an organic group, or a siloxy group, X=a halogen atom or an alkoxy group) type compound. As shapes of molecular arrangement, there are known typically an amorphous structure, a ladder structure, a cage (completely condensed cage) structure or a partially cleaved structure thereof (a structure wherein one silicon atom is removed from the cage structure or a structure wherein a part of silicon-oxygen bonds is cleaved), or the like.

The inventors have investigated the effects of incorporating various organic silicon compounds to polyphenylene ether-based resins. As a result, they have found that the incorporation of a cage silsesquioxane having a specific structure or/and a partially cleaved structure of the cage silsesquioxane, among various organic silicon compounds, to polyphenylene ether-based resins affords a polyphenylene ether-based resin composition which is excellent in moldability (or melt flowability) and affords a molded article excellent in flame resistance and mechanical properties, and thus they have accomplished the invention.

As an example of specific structure of the cage silsesquioxane for use in the invention, a cage silsesquioxane represented by the following general formula (A) may be mentioned, for example. Moreover, as an example of specific structure of the partially cleaved structure of the cage silsesquioxane for use in the invention, a partially cleaved structure of the cage silsesquioxane represented by the following general formula (B) may be mentioned, for example. However, the structure of the cage silsesquioxane or partially cleaved structure thereof for use in the invention is not limited to these structures.

 (A)

 (B)

wherein, in the general formulae (A) and (B), R is selected from a hydrogen atom, an alkoxyl group having 1 to 6 carbon atoms, a substituted or unsubstituted hydrocarbon group having 1 to 20 carbon atoms, and a silicon atom-containing group having 1 to 10 silicon atoms, and all of R's may be the same or may comprise a plurality of the groups.

Examples of the cage silsesquioxane represented by the general formula (A) for use in the invention include a type represented by the chemical formula $[RSiO_{3/2}]_6$ (the following general formula (3)), a type represented by the chemical formula $[RSiO_{3/2}]_8$ (the following general formula (4)), a type represented by the chemical formula $[RSiO_{3/2}]_{10}$ (the following general formula (5)), a type represented by the chemical formula $[RSiO_{3/2}]_{12}$ (the following general formula (6)), and a type represented by the chemical formula $[RSiO_{3/2}]_{14}$ (the following general formula (7)).

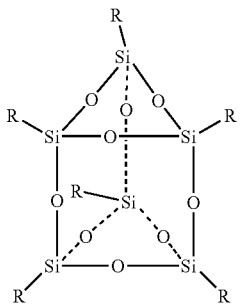

General formula (3)

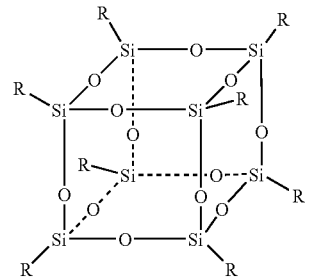

General formula (4)

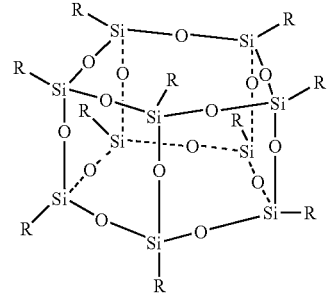

General formula (5)

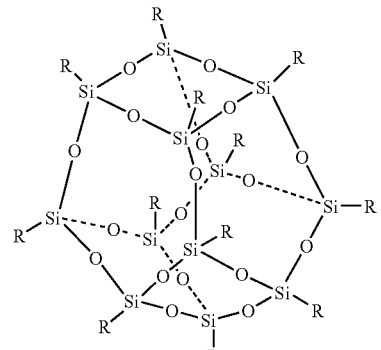

General formula (6)

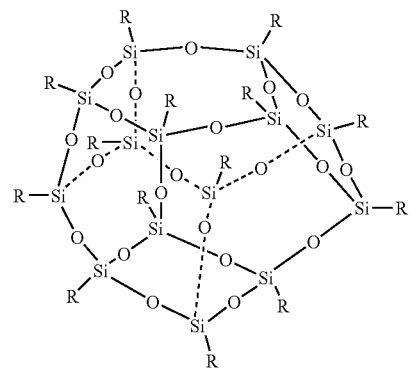

General formula (7)

The value n in the cage silsesquioxane represented by the general formula (A) $[RSiO_{3/2}]_n$ of the invention is an integer of 6 to 14, preferably 8, 10 or 12, more preferably 8, 10 or a mixture of 8 and 10 or a mixture of 8, 10, and 12, particularly preferably 8 or 10.

Moreover, in the invention, it is also possible to use a structure wherein a part of silicon-oxygen bonds in the cage silsesquioxane is partially cleaved, or a structure wherein a part of the cage silsesquioxane is eliminated, or a partially cleaved structure of the cage silsesquioxane represented by the general formula (B) $(RSiO_{3/2})_l(RXSiO)_k$ (l is an integer of 2 to 12 and k is 2 or 3), which is derived from the above structures.

In the general formula (B), X is a group selected from $OR_1$ ($R_1$ is a hydrogen atom, an alkyl group, an aryl group, a quaternary ammonium radical), halogen atom and groups defined in the above R, and a plurality of X's may be the same or different or a plurality of X's in $(RXSiO)_k$ may be connected to each other to form a connected structure. Moreover, l is an integer of 2 to 12, preferably an integer of 4 to 10, particularly preferably 4, 6 or 8. k is 2 or 3.

Two or three X's in $(RXSiO)_k$ may be connected to the other X's in the same molecule each other to form a variety of connected structures. Specific examples of the connected structures will be described in the following.

Two X's in the same molecule of the general formula (B) may form an intramolecular connected structure represented by the general formula (1). Furthermore, two X's present in different molecules may be connected to each other to form a dinuclear structure through the connected structure represented by the above general formula (1).

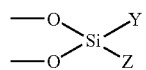

General formula (1)

wherein Y and Z are selected from the group consisting of the same groups as those for X, and Y and Z may be the same or different.

Examples of the connected structure represented by the general formula (1) include the following divalent group structures.

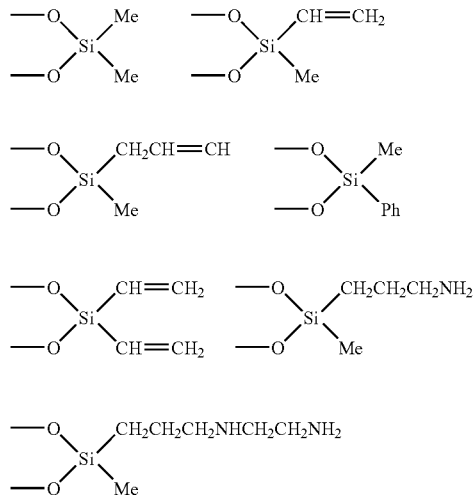

Moreover, in the case that two X's in the same molecule in the general formula (B) is connected to each other to form a connected structure, the connected structure may be a connected structure represented by the general formula (15). Q in the general formula (15) is a substituted or unsubstituted hydrocarbon group having 1 to 20 carbon atoms or a hydrogen atom among the groups for R in the general formulae (A) and (B) (for example, cf. Mat. Res. Soc. Symp. Prac. 1999, 576, 111).

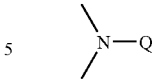

General formula (15)

Furthermore, two or three X's in the general formula (B) may be connected to form a connected structure containing a metal atom other than a silicon atom. Examples of the connected structure containing the other metal atom in this case include a connected structure containing a bond of [Si—O-metal atom] type, an organometal-type connected structure, or the like. As a specific example of the compound of the general formula (B) having a connected structure containing another metal atom, a structure wherein one Si in $(RSiO_{3/2})_n$ constituting the general formula (A) is replaced by another metal atom or an organometallic group may be mentioned. Moreover, two X's in the general formula (B) may be replaced with metal atoms other than silicon atoms. Examples of the other metal atom or the metal atom in the organometal-type connected structure include Al, Ti, Zr, V, Ta, Cr, Mo, W, Re, Ru, Pt, Sn, Sb, Ga, Tl and the like. The cage silsesquioxane and/or partially cleaved structure thereof may form a dinuclear structure through the incorporation of these metal atoms (for example, cf. Feher at al., Polyhedron, 1995, 14, 3239 and Organometallics, 1995, 14, 3920).

Among the above various connected structures in the compounds represented by the general formula (B), the connected structure represented by the general formula (1) is easy to synthesize and is preferable.

Examples of the compounds represented by the general formula (B) for use in the invention include a trisilanol compound which has a structure wherein a part of the general formula (4) is eliminated or a type represented by the chemical formula $(RSiO_{3/2})_4(RXSiO)_3$ synthesized thereform (e.g., the following general formula (8)), a type wherein two X's of the three X's in the general formula (8) or $(RSiO_{3/2})_4(RXSiO)_3$ form a connected structure represented by the general formula (1) (e.g., the following general formula (9)), a type represented by the chemical formula $(RSiO_{3/2})_6(RXSiO)_2$ derived from a disilanol compound wherein a part of the general formula (4) is cleaved (e.g., the following general formulae (10) and (11)), a type wherein two X's in the general formula (10) or $(RSiO_{3/2})_6(RXSiO)_2$ form a connected structure represented by the general formula (1) (e.g., the following general formula (12)), and the like. The mutual positions of R and X or Y and Z connected to the same silicon atom in the general formulae (8) to (12) may be exchangeable. Furthermore, two X's present in the different molecules may be connected to each other to form a dinuclear structure through a variety of the connected structures including the above general formula (1) as a representative.

Moreover, as a specific example of the compound wherein two or three X's in the general formula (B) is connected to form a connected structure containing a metal atom other than a silicon atom, there may be mentioned a compound represented by the chemical formula $(RSiO_{3/2})_4(RXSiO)_3$ wherein three X's in the compound represented by the general formula (8) form a connected structure containing a Ti atom (e.g., the following general formula (8-Ti)).

These various cage silsesquioxanes or partially cleaved structures thereof may be used singly or as a mixture of two or more of them.

General formula (8)

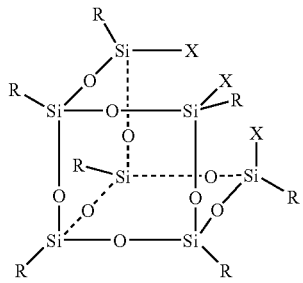

General formula (8-Ti)

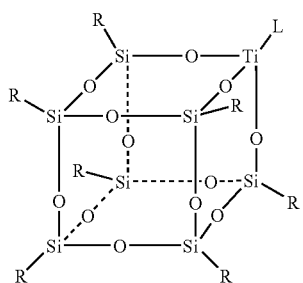

General formula (9)

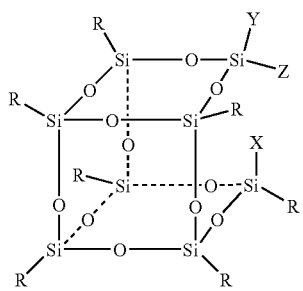

General formula (10)

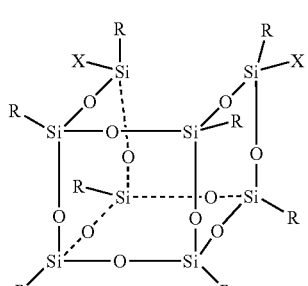

General formula (11)

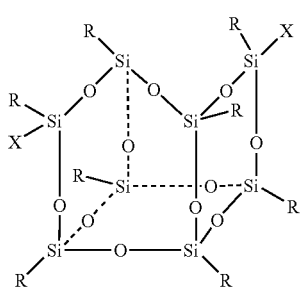

-continued

General formula (12)

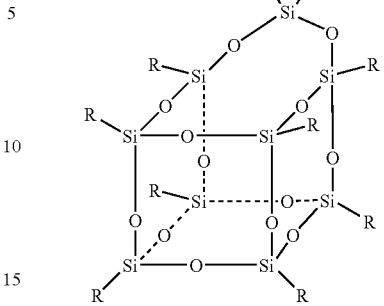

The kinds of R in the compounds represented by the general formula (A) and/or the general formula (B) for use in the invention include a hydrogen atom, an alkoxyl group having 1 to 6 carbon atoms, an aryloxy group, a substituted or unsubstituted hydrocarbon group having 1 to 20 carbon atoms, and a silicon atom-containing group having 1 to 10 silicon atoms.

Examples of the alkoxyl group having 1 to 6 carbon atoms include a methoxy group, an ethoxy group, an n-propyloxy group, an i-propyloxy group, an n-butyloxy group, a t-butyloxy group, an n-hexyloxy group, a cyclohexyloxy group, and the like. Examples of the aryloxy group include a phenoxy group, 2,6-dimethylphenoxy group, and the like. The total number of the alkoxyl groups and aryl oxy groups in one molecule of the general formula (A) or (B) is preferably 3 or less, more preferably 1 or less.

Examples of the hydrocarbon group having 1 to 20 carbon atoms include acyclic or cyclic aliphatic hydrocarbon groups such as methyl ethyl, n-propyl, i-propyl, butyl (n-butyl, i-butyl, t-butyl, sec-butyl), pentyl(n-pentyl, i-pentyl, neopentyl, cyclopentyl, etc.), hexyl(n-hexyl, i-hexyl, cyclohexyl, etc.), heptyl(n-heptyl, i-heptyl, etc.), octyl(n-octyl, i-octyl, t-octyl, etc.), nonyl(n-nonyl, i-nonyl, etc.), decyl(n-decyl, i-decyl, etc.), undecyl(n-undecyl, i-undecyl, etc.), and dodecyl(n-dodecyl, i-dodecyl, etc.) groups; acyclic or cyclic alkenyl groups such as vinyl, propenyl, butenyl, pentenyl, hexenyl, cyclohexenyl, cyclohexenylethyl, norbornenylethyl, heptenyl, octenyl, nonenyl, decenyl, undecenyl, dodecenyl, and styrenyl groups; aralkyl groups such as benzyl, phenethyl, 2-methylbenzyl, 3-methylbenzyl, and 4-methylbenzyl groups; aralkenyl groups such as a PhCH=CH— group; aryl groups such as a phenyl group, a tolyl group, and a xylyl group; substituted aryl groups such as a 4-aminophenyl group, a 4-hydroxyphenyl group, a 4-metoxyphenyl group, and a 4-vinylphenyl group; and the like.

In the case that the ratio of the number of particularly the aliphatic hydrocarbon group having 2 to 20 carbon atoms and the alkenyl group having 2 to 20 carbon atoms of these hydrocarbon groups to the total number of R, X, Y, and Z is larger, particularly good melt flowability at molding is obtained. Moreover, in the case that R is an aliphatic hydrocarbon group and/or an alkenyl group, the number of carbon atoms in R is usually 20 or less, preferably 16 or less, more preferably 12 or less in view of a good balance of melt flowability at molding, flame resistance, and operability.

Furthermore, R for use in the invention may be a group wherein hydrogen atom(s) or a part of main chain skeleton of these various hydrocarbon groups may be partially replaced with substituent(s) selected from polar groups (polar bonds) such as an ether bond, an ester group (bond), a hydroxyl group, a carbonyl group, a carboxylic acid anhydride bond, a thiol group, a thioether bond, a sulfone group, an aldehyde group, an epoxy group, an amino group, an amide group (bond), a urea group (bond), an isocyanate group, and a cyano group, or halogen atoms such as fluorine atom, chlorine atom, and bromine atom.

The total number of carbon atoms in the substituted or unsubstituted hydrocarbon group including its substituent(s) in R in the general formulae (A) and (B) may be usually 20 or less, preferably 16 or less, particularly preferably 12 or less in view of a good balance of melt flowability at molding, flame resistance, and operability.

As the silicon atom-containing group having 1 to 10 silicon atoms adopted as R, those having a wide variety of structures are adopted, and a group having the following general formula (13) or (14) may be mentioned, for example. The number of the silicon atoms in the silicon atom-containing group is usually in the range of 1 to 10, preferably in the range of 1 to 6, more preferably in the range of 1 to 3. Too many a number of the silicone atoms is not preferable because the cage silsesquioxane compound becomes a viscous liquid and is difficult to handle or purify.

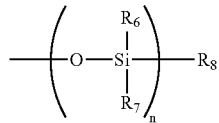

General formula (13)

n in the general formula (13) is usually an integer in the range of 1 to 10, preferably an integer in the range of 1 to 6, more preferably an integer in the range of 1 to 3. Moreover, the substituents $R_6$ and $R_7$ in the general formula (13) is a hydrogen atom, a hydroxyl group, an alkoxy group, a chlorine atom, or an organic group having 1 to 10 carbon atoms, preferably 1 to 6 carbon atoms other than an alkoxy group.

Examples of the alkoxy group include a methoxy group, an ethoxy group, a butoxy group and the like.

As examples of the organic group having 1 to 10 carbon atoms other than an alkoxy group, various substituted or unsubstituted hydrocarbon groups may be mentioned. Specific examples thereof include aliphatic hydrocarbon groups such as a methyl group, an ethyl group, a propyl group, a butyl group and a cyclohexyl group; unsaturated hydrocarbon bond-containing groups such as a vinyl group and a propenyl group; aromatic hydrocarbon groups such as a phenyl group, a benzyl group and a phenethyl group; fluorine-containing alkyl group such as $CF_3CH_2CH_2$—; polar group-substituted alkyl groups such as an aminoalkyl group; and the like.

$R_8$ in the general formula (13) is a hydrogen atom or an organic group having 1 to 20 carbon atoms, preferably 1 to 12 carbon atoms, more preferably 1 to 8 carbon atoms. Examples of the organic group include aliphatic hydrocarbon groups such as a methyl group, an ethyl group, a propyl group, a butyl group, a pentyl group, a cyclopentyl group, a hexyl group, a cyclohexyl group, a 2-cyclohexyl-ethyl group, an octyl group and a dodecyl group; unsaturated hydrocarbon bond-containing groups such as a vinyl group, an ethynyl group, an allyl group and a 2-cyclohexenyl-ethyl group; aromatic hydrocarbon groups such as a phenyl group, a benzyl group and a phenethyl group; fluorine atom-containing groups, e.g., fluorine-containing alkyl group such as a 3,3,3-trifluoro-n-propyl group and fluorine-containing ether groups such as a $CF_3CF_2CF_2OCH_2CH_2CH_2$— group; and hydrocarbon groups substituted with polar substituent(s), such as an aminopropyl group, an aminoethylaminopropyl group, an aminoethylaminophenethyl group, an acryloxypropyl group and a cyanopropyl group and the like. In this connection, in the general formula (13), two or more hydrogen atoms are not connected to the same silicon atom at the same time. Specific examples of the silicon atom-containing group represented by the general formula (13) include a trimethylsiloxy group ($Me_3Si$—), a dimethylphenylsiloxy group ($Me_2PhSiO$—), a diphenylmethylsiloxy group, a phenethyldimethylsiloxy group, a dimethyl-n-hexylsiloxy group, a dimetylcyclohexylsiloxy group, a dimethyloctylsiloxy group, $(CH_3)_3SiO[Si(CH_3)_2O]_k$— (k=1 to 9), a 2-phenyl-2,4,4,4-tetramethyldisiloxy group (OSiPhMeO-SiMe$_3$), 4,4-diphenyl-2,2,4-trimethyldisiloxy (OSiMe$_2$OSiMePh$_2$), 2,4-diphenyl-2,4,4-trimethyldisiloxy (OSiPhMeOSiPhMe$_2$), a vinyldimethylsiloxy group, a 3-glycidylpropyldimethylsiloxy group, a 3-aminopropyldimethylsiloxy group ($H_2NCH_2CH_2CH_2Me_2SiO$—), $H_2NCH_2CH_2CH_2Me(HO)SiO$—, a 3-(2-aminoethylamino)propyldimethylsiloxy group ($H_2NCH_2CH_2NHCH_2CH_2CH_2Me_2SiO$—), $H_2NCH_2CH_2NHCH_2CH_2CH_2Me(HO)SiO$—, and the like.

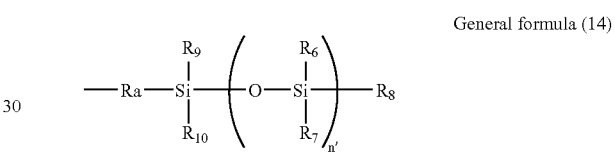

General formula (14)

In the general formula (14), Ra is a divalent hydrocarbon group having 1 to 10 carbon atoms and the number of the carbon atoms is preferably in the range of 2 to 6, particularly preferably 2 or 3. Specific examples of Ra include alkylene groups such as —$CH_2CH_2$—, —$CH_2CH_2CH_2$—, and —(CH2)$_m$— (m=4 to 10).

The definitions of $R_6$, $R_7$ and $R_8$ in the general formula (14) are the same as those of $R_6$, $R_7$ and $R_8$ in the general formula (13), respectively. Moreover, the definitions of $R_9$ and $R_{10}$ are the same as those of $R_6$ and $R_7$. n' is 0 or an integer of the range of 1 to 9 but is preferably 0 or an integer of the range of 1 to 5, particularly preferably 0, 1 or 2.

In the invention, cage silsesquioxanes and/or partially cleaved structures thereof having a wide range of structures including the general formula (A) and/or the general formula (B) as representative(s) are used. In the general formulae (A) and (B), a plurality of R, X, Y and Z in one molecule may be the same or different from each other.

Among the compounds represented by the general formulae (A) and (B), as a group of the compounds exhibiting particularly excellent effects of both of a moldability (or melt flowability)-enhancing effect and a flame resistance-enhancing effect of the polyphenylene ether-based resin composition, there may be mentioned a group of the compounds having a ratio of "the number of R, X, Y and Z which are aromatic hydrocarbon groups" to "the number of all of R, X, Y and Z" of preferably 93% or less, more preferably 90% or less, particularly preferably 80% or less, further preferably 70% or less. In this connection, in the both cases of "the number of all of R, X, Y and Z" and "the number of R, X, Y and Z which are aromatic hydrocarbon groups", each of the same groups in all of R, X, Y and Z is to be counted as one substituent. In the compounds represented by the general formulae (A) and (B), particularly the compounds represented by the general formula (A), when the ratio of "the number of R, X, Y and Z which are aromatic hydrocarbon groups" to "the number of all of R, X, Y and Z" becomes more than the above ratio, the flowability-enhancing effect and flame resistance-enhancing effect of the polyphenylene ether-based resin composition tend to decrease. Therefore, in the compounds represented by the general formulae (A) and (B), particularly the compounds represented by the general formula (A), the ratio of "the number of R, X, Y and Z which are aromatic hydrocarbon groups" is preferably within the above range. In this connection, the aromatic hydrocarbon group herein means an aromatic hydrocarbon group selected from aryl groups and aralkyl groups. Since a polyphenylene ether resin is a polymer containing aromatic nuclei as main constituents, such effects of the aromatic hydrocarbon group having a similar structure to the polymer structure are entirely unexpectable effects based on the hitherto known facts and are revealed for the first time by the precise investigation of the inventors.

Among the compounds represented by the general formulae (A) and (B), as another group of the compounds exhibiting particularly excellent effects of both of a moldability (or melt flowability)-enhancing effect and a flame resistance-enhancing effect of the polyphenylene ether-based resin composition, there may be mentioned a group of the compounds wherein at least one of R, X, Y and Z in the general formula (A) and/or the general formula (B) is 1) a group containing an unsaturated hydrocarbon bond or 2) a group having a polar group containing a nitrogen atom and/or an oxygen atom. In the case that R, X, Y or Z is composed of two or more kinds of groups, it is sufficient that at least one of the groups is the group of above 1) or 2).

Examples of the group containing an unsaturated hydrocarbon bond include acyclic or cyclic alkenyl and alkynyl groups such as vinyl, propenyl, butenyl, pentenyl, hexenyl, cyclohexenyl, cyclohexenylethyl, norbornenyl, norbornenylethyl, heptenyl, octenyl, nonenyl, decenyl, undecenyl, dodecenyl, styrenyl and styryl groups, or groups containing these groups. Specific examples of the above group containing an unsaturated hydrocarbon bond include a vinyl group, an allyl group, a 2-(3,4-cyclohexenyl)ethyl group, a 3,4-cyclohexenyl group, a dimethylvinylsiloxy group, a dimethylallylsiloxy group, a (3-acryloylpropyl)dimethylsiloxy group, a (3-methacryloylpropyl)dimethylsiloxy group, and the like.

Moreover, examples of the group having a polar group containing a nitrogen atom and/or an oxygen atom include groups containing an ether bond, an ester bond, a hydroxyl group, a carbonyl group, an aldehyde group, an epoxy group (bond), an amino group, an amide group (bond), a cyano group, a urea group (bond), an isocyanate group, and the like. Among them, a group containing an amino group or epoxy group is particularly preferred. Specific examples of the above group containing an amino group include 3-aminopropyl group ($H_2NCH_2CH_2CH_2-$), a 3-aminopropyldimethylsiloxy group ($H_2NCH_2CH_2CH_2Me_2SiO-$), $H_2NCH_2CH_2CH_2Me(HO)SiO-$, a 3-(2-aminoethylamino)propyl group ($H_2NCH_2CH_2NHCH_2CH_2CH_2-$), a 3-(2-aminoethylamino)propyldimethylsiloxy group ($H_2NCH_2CH_2NHCH_2CH_2CH_2Me_2SiO-$), $H_2NCH_2CH_2NHCH_2CH_2CH_2Me(HO)SiO-$, and the like. Moreover, specific examples of the above group containing an epoxy group include a 3-glycidyloxypropyl group, a 3-glycidyloxypropyldimethylsiloxy group, a 2-(3,4-epoxycyclohexyl)ethyl group, a 2-(3,4-epoxycyclohexyl)ethyldimethylsiloxy group, and the like.

R, X, Y and Z each independently may be selected from various structures and also, R, X, Y and Z each may be composed of a plurality of groups.

As a result of studies on the structures of cage silsesquioxanes and partially cleaved structures of the cage silsesquioxanes suitable for the polyphenylene ether-based resin composition of the invention from wide and various viewpoints, the inventors have found that, among the compounds of the general formula (B), a compound (hereinafter, abbreviated as compound (B-0)) wherein a) at least one of a plurality of X's is a group selected from a hydroxyl group and $-OSi(OH)Y"Z"$ and b) at least one of a plurality of X's is 1) a group containing an unsaturated hydrocarbon bond or 2) a group having a polar group containing at least one of a nitrogen atom and an oxygen atom as mentioned above, which exhibits excellent effects in the compounds of the general formulae (A) and (B), provides a practically extremely excellent composition which is excellent in the low volatility in addition to the melt flowability-enhancing effect and the flame resistance-enhancing effect described in the above. Y" and Z" in the above $-OSi(OH)Y"Z"$ are selected from the group consisting of the same groups as those for X in the general formula (B) and Y" and Z" may be the same or different.

In this connection, the case that at least one of a plurality of X's is a group containing an amino group in the above compound (B-0) is more preferred since it affords a polyphenylene ether-based resin composition having particularly excellent and balanced characteristic properties of any of a high melt flowability, a high flame resistance, and a low volatility. Moreover, the amino group-containing compound (B-0) is a compound on which novel excellent characteristic properties as mentioned above are confirmed and also is a novel substance hitherto unknown.

As an example of more specific structure of the compound (B-0), the following general formula (B-1) may be mentioned, for example.

$$(RSiO_{3/2})_l(RX_{a1}SiO)(Rx_{a2}SiO)(RX_bSiO) \tag{B-1}$$

wherein, in the general formula (B-1), R and l are the same as in the case of the general formula (B); $X_{a1}$ and $X_{a2}$ are selected from the group consisting of the same groups as those for X in the general formula (B) and $X_{a1}$ and $X_{a2}$ may be connected to each other to form a connected structure represented by the general formula (1-1):

General formula (1-1)

wherein $X_b$ is a group selected from a hydroxyl group and $-OSi(OH)Y"Z"$; Y', Z', Y" and Z" are selected form a group consisting of the same groups as those for X in the general formula (B); provided that at least one of $X_{a1}$, $X_{a2}$, $X_b$, Y', Z', Y" and Z" in the same compound is 1) a group containing an unsaturated hydrocarbon bond or 2) a group having a polar group containing a nitrogen atom and/or an oxygen atom and $X_{a1}$, $X_{a2}$, $X_b$, Y', Z', Y" and Z" are the same or different from each other. Moreover, with regard to Y" and Z" in the general formula (B-1), the specific examples thereof will be described below. Y" and Z" in the general formula (B-0) are also selected from groups consisting of the same groups as those for Y" and Z" in the general formula (B-1), respectively.

Among the compounds of the general formula (B-1), the case that at least one of $X_{a1}$, $X_{a2}$, $X_b$, Y', Z', Y" and Z" is a group containing an amino group is more preferred since it affords a polyphenylene ether-based resin composition having particularly excellent and balanced characteristic properties of any of a high melt flowability, a high flame resistance, and a low volatility.

Moreover, in the compounds of the general formula (B-1), the partially cleaved structure of the cage silsesquioxane wherein at least one of $X_{a1}$, $X_{a2}$, $X_b$, Y', Z' Y" and Z" is a group containing an amino group is a compound on which novel excellent characteristic properties as mentioned above are confirmed and also is a novel substance hitherto unknown.

Examples of the specific structure include the compounds having the following skeletal structures (examples wherein l=4 in the general formula (B-1)) but the structure is not limited thereto.

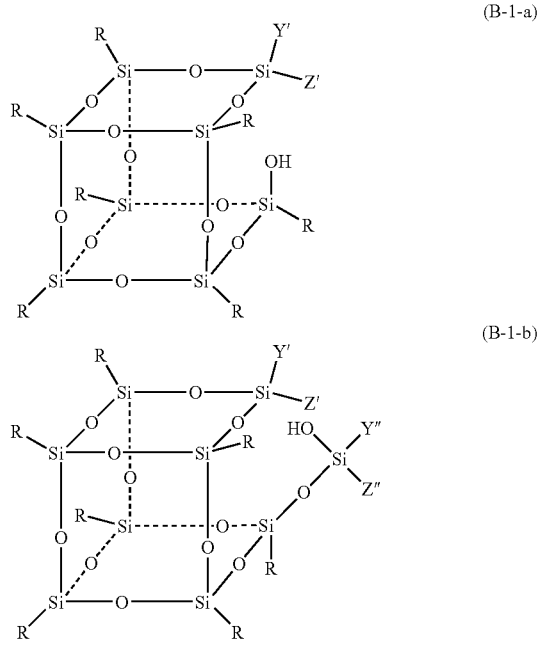

(B-1-a)

(B-1-b)

In the above compounds (B-1-a) and (B-1-b), the mutual positions of Y' group and Z' group, the OH group and R group or —OSi(OH)Y"Z" group and R group bonded to the same silicon atom may be exchanged each other. Specific examples of Y' and Y" in the above compound (B-1-a) and (B-1-b) include lower alkyl groups such as methyl and propyl groups, and a phenyl group. Specific examples of Z' and Z" include aliphatic amino groups such as a —CH$_2$CH$_2$CH$_2$NH$_2$ group and a —CH$_2$CH$_2$CH$_2$NHCH$_2$CH$_2$CH$_2$NH$_2$ group and aromatic amino groups such as a —CH$_2$CH$_2$C$_6$H$_4$NH$_2$ group. In this connection, in the case that Z' is a group containing an amino group, Z" is not necessarily a group containing an amino group. To the contrary, in the case that Z" is a group containing an amino group, Z' is not necessarily a group containing an amino group.

The reason why the compound represented by the general formula (B-1), particularly the compound represented by the general formula (B-1) wherein at least one of Y', Z', Y" and Z" is a group containing an amino group is excellent in the low volatility in addition to the melt flowability-improving effect and flame resistance-improving effect and provides a practically extremely excellent composition is not clear at this moment. However, with regard to the low volatility of the compound represented by the general formula (B-1), since the compound represented by the general formula (B-1) contains at least one silanol group, for example, there is considered a possibility that the silanol group inhibits the volatility of the compound for some reason.

With regard to the volatility of the compound represented by the general formula (B-1), when compared with that of the cage silsesquioxane or partially cleaved structure of the cage silsesquioxane containing a similar functional group but no silanol group, an initiation temperature of thermal decomposition or an initiation temperature of sublimation, e.g., a temperature at which a 10% weight decrease is observed on thermogravimetric analysis (TGA) is elevated by several ten ° C. or more and thus the compound is preferred.

The cage silsesquioxane represented by the general formula (A) or the partially cleaved structure of the cage silsesquioxane represented by the general formula (B) for use in the invention has both a feature that the polyphenylene ether-based resin composition results in a small mold deposit at melt molding as shown in Examples. In the case of the compound represented by the general formula (B-1), the low volatility is further improved with still having a high melt flowability and a high flame resistance. Therefore, in the melt molding of the polyphenylene ether-based resin composition of the invention using the compound represented by the general formula (B-1), it is possible to carry out a highly precise molding with a particularly small mold deposit. Such a feature of the compound represented by the general formula (B-1), particularly the compound represented by the general formula (B-1) wherein at least one of Y', Z', Y" and Z" is a group containing an amino group is extremely important for the production of a precise molded article.

With regard to the compound represented by the general formula (B-1), it is also an important feature that the compound having a structure containing a variety of functional groups suitable for intended use can be synthesized extremely easily. Namely, the compound represented by the general formula (B-1) is easily synthesized by the reaction of a trisilanol compound wherein k is 3 and X is OH in the general formula (B) with a Y'Z'SiD$_2$ (D=Cl, a lower alkoxyl group such as —OMe or —OEt, or the like) type compound and/or a Y"Z"SiD$_2$ (D=Cl, a lower alkoxyl group such as —OMe or —OEt, or the like) type compound.

Synthetic examples thereof will be illustrated in the following but are not limited thereto.

Reaction scheme (A-1)

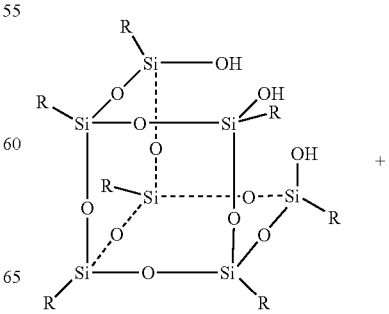

+

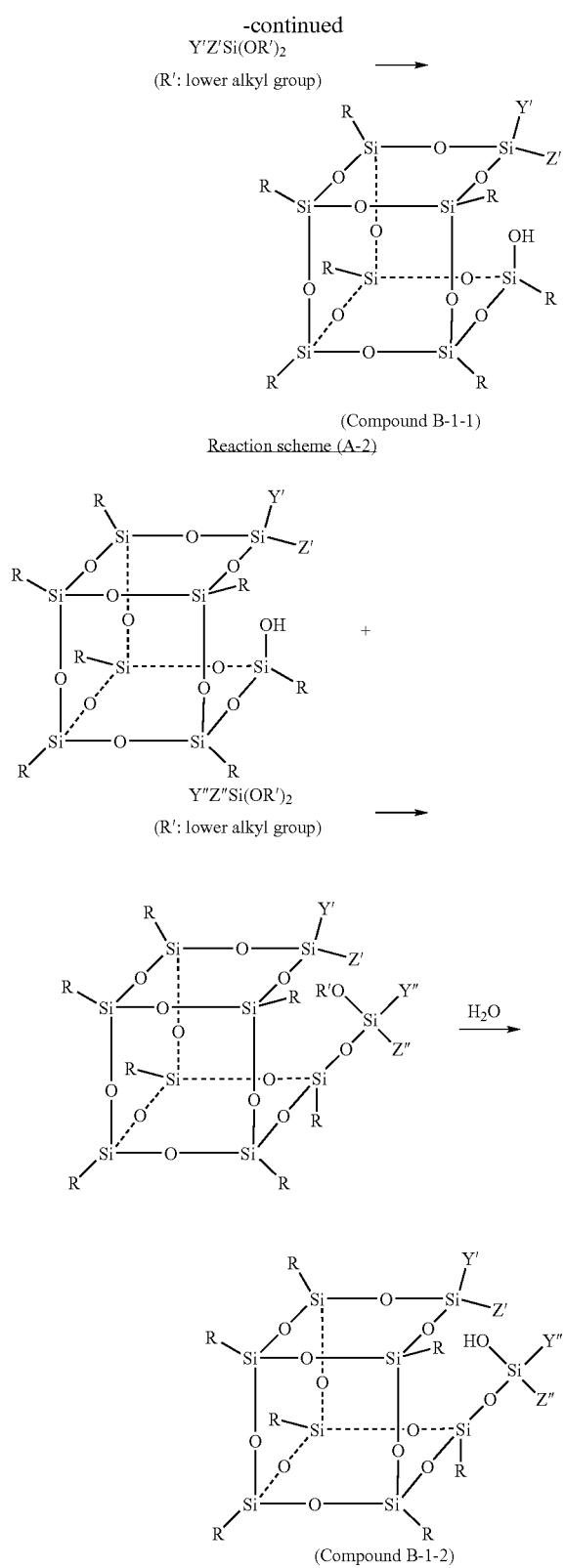

In the above compounds (B-1-1) and (B-1-2), the mutual positions of Y' group and Z' group, the OH group and R group or —OSi(OH)Y"Z" group and R group bonded to the same silicon atom may be exchanged for each other.

In this connection, a compound having a structure wherein the above group in the case that $X_b$ in the general formula (B-1) is a hydroxyl group or the OH group contained in —OSi(OH)Y"Z" in the case that $X_b$ is the group is a chlorine atom or an alkoxyl group is easily hydrolyzed by the action of a minute amount of water or the like present in the air and is converted into the structure of the compound of the general formula (B-1). Therefore, the above chlorine atom-containing group or alkoxyl group-containing group can be regarded as an equivalent of the compound of the general formula (B-1) for use in the invention.

The cage silsesquioxane of the invention can be synthesized by the methods described in Brown et al., J. Am. Chem. Soc. 1965, 87, 4313, Feher et al., J. Am. Chem. Soc. 1989, 111, 1741 or Organometallics 1991, 10, 2526, and the like. For example, the compound can be obtained as crystals by reacting cyclohexyltriethoxysilane in water/methyl isobutyl ketone with adding tetramethylammonium hydroxide as a catalyst. Moreover, trisilanol compounds and disilanol compounds represented by the general formulae (8) (X=OH), (10) (X=OH) and (11) (X=OH) are formed at the production of completely condensed cage silsesquioxane at the same time or can be also synthesized by partial cleavage of the completely condensed cage silsesquioxane with trifluoro acid or tetraethylammonium hydroxide (cf. Feher et al., Chem. Commun., 1998, 1279). Furthermore, the compound of the general formula (8) (X=OH) can be also synthesized directly from a $RSiT_3$ (T=Cl or an alkoxyl group) type compound.

As a method of introducing a different substituent R' instead of only one R of eight R's in the general formula (4), there is mentioned a method of reacting the trisilanol compound represented by the general formula (8) (X=OH) with $R'SiCl_3$, $R'Si(OMe)_3$, $R'Si(OEt)_3$, or the like. As a specific example of such a synthesis, a partially cleaved structure of the cage silsesquioxane represented by the general formula (8) (R=a cyclohexyl group, X=OH) is synthesized by the above method, and then the desired compound can be synthesized by adding 3 equivalents of triethylamine to a mixture of 1 equivalent of $HSiCl_3$ and 1 equivalent of the partially cleaved structure of the cage silsesquioxane represented by the general formula (8) (R=a cyclohexyl group, X=OH) in a tetrahydrofuran solution (e.g., cf. Brown et al., J. Am. Chem. Soc. 1965, 87, 4313).

As a specific example of the method for introducing a silicon atom-containing group as X in the partially cleaved structure of the cage silsesquioxane represented by the general formula (B), there may be, for example, mentioned a method for producing a compound into which a $Me_3SiO$— group is introduced as X by adding 3 equivalents of triethylamine and 3 equivalents of trimethylchlorosilane in tetrahydrofuran relative to 1 equivalent of the partially cleaved structure of the cage silsesquioxane represented by the general formula (8) (R=a cyclohexyl group, X=OH) (e.g., cf. J. Am. Chem. Soc. 1989, 111, 1741).

The structural analysis of the cage silsesquioxane of the invention can be carried out by X-ray structural analysis (Larsson et al., Alkiv Kemi 16, 209 (1960)) but simply, identification can be carried out by infra-red absorption spectroscopy and NMR (e.g., cf. Vogt et al., Inorga. Chem. 2, 189 (1963)).

The cage silsesquioxane or partially cleaved structure of the cage silsesquioxane for use in the invention may be used singly or as a mixture of two or more of them. Furthermore, the cage silsesquioxane and partially cleaved structure of the cage silsesquioxane may be used in combination.

Moreover, the cage silsesquioxane, partially cleaved structure of the cage silsesquioxane, or mixture thereof for use in the invention may be used in combination with other organosilicon compounds having the other structures. Examples of the organosilicon compounds having the other structures in this case include polydimethylsilicone, polydimethyl/methylphenylsilicone, substituted silicone compounds containing polar substituents such as amino groups, hydroxyl groups, or the like, amorphous polymethylsilsesquioxanes, various ladder-type silsesquioxanes, and the like. At that case, the composition ratio of the mixture is not particularly limited but usually, the ratio of the cage silsesquioxane and/or partially cleaved structure thereof to be used in the above mixture is preferably 10% by weight or more, more preferably 30% by weight or more, particularly preferably 50% by weight or more.

When an amorphous polysilsesquioxane which does not form a cage is used as an additive for a polyphenylene ether-based resin composition instead of the cage silsesquioxane or partially cleaved structure of the cage silsesquioxane represented by the general formulae (A), (B) and (3) to (12) for use in the invention, the effect on the melt flowability enhancement and flame resistance enhancement are found to be small.

The content of the cage silsesquioxane represented by the general formula (A), the partially cleaved structure of the cage silsesquioxane represented by the general formula (A), or a mixture thereof in the polyphenylene ether-based resin composition of the invention is preferably from 0.1% by weight to 90% by weight. The content to be used is more preferably in the range of 0.1% by weight to 50% by weight, further preferably in the range of 0.5% by weight to 30% by weight, particularly preferably in the range of 0.5% by weight to 15% by weight. When the amount added is smaller than the above range, the effects on the melt flowability enhancement and flame resistance enhancement are found to be small. When it is larger than the above range, physical properties such as mechanical strength decrease and thus the case is not preferable. In the polyphenylene ether-based resin composition of the invention, as specifically shown in Examples to be described below, the cage silsesquioxane represented by the general formula (A), the partially cleaved structure of the cage silsesquioxane represented by the general formula (B), or a mixture thereof exhibits excellent melt flowability-enhancing effect and/or flame resistance-enhancing effect even when added in an extremely small amount. Therefore, in this composition, different from the cases of using other additives hitherto known, there is an industrially extremely important advantage that the melt flowability and flame resistance can be improved with hardly impairing the high heat resistance and good mechanical properties, which are original features of a polyphenylene ether resin.

The polyphenylene ether-based resin composition of the invention may be further incorporated with a cyclic nitrogen compound having a specific structure as a flame retardant aid. The cyclic nitrogen compound for use in the invention means a compound basically having a triazine skeleton in the molecule and a melamine derivative. Specific examples thereof preferably include melamine, melem, and mellon which are melamine derivatives. Among them, melem and mellon are preferred in view of the low volatility. The cyclic nitrogen compound is preferably a finely powdered one for exhibiting a flame resistance-enhancing effect. The size of the finely powdered particles is that finely powdered to an average particle size of preferably 30 μm or less, more preferably 0.05 to 5 μm.

The content of the above cyclic nitrogen compound in the polyphenylene ether-based resin composition of the invention is preferably in the range of 0.1% by weight to 20% by weight, more preferably in the range of 0.2% by weight to 10% by weight. When the amount added is smaller than the above range, the effect on the flame resistance is found to be small and when the amount added is larger than the above range, the mechanical properties decreases, so that the cases are not preferable.

The polyphenylene ether-based resin composition of the invention may be incorporated with a fluorine resin for enhancing the flame resistance. Examples of the fluorine resin include polymonofluoroethylene, polyvinylidene fluoride, polytrifluoroethylene, polytetrafluoroethylene, a tetrafluoroethylene/hexafluoropropylene copolymer, and the like. Particularly preferred is polytetrafluoroethylene. Moreover, a copolymer of a fluorine-containing monomer constituting the above polymer with a copolymerizable monomer may be used. The amount of the fluorine resin to be added is not limited unless the melt flowability of the invention is impaired, but the content in the polyphenylene ether-based resin composition is preferably from 0.01 to 10% by weight, more preferably from 0.03 to 8% by weight, particularly preferably from 0.05 to 6% by weight. When the content is less than 0.01% by weight, the flame resistance-enhancing effect is found to be small and when it exceed 10% by weight, the moldability and the like decrease, so that the cases are not preferable.

Furthermore, the polyphenylene ether-based resin composition of the invention may be combined with various inorganic fillers in an amount of the range wherein meltmolding of the composition is possible. Incorporation of the inorganic filler can enhance heat resistance, mechanical strength, flame resistance and the like. Examples of the inorganic filler include fibrous materials such as glass fibers and carbon fibers, microparticulate silica (fumed silica), particulate silica, glass beads, glass flakes, talc, diatomaceous earth, mica, and the like. Furthermore, fumed silica whose surface is modified with various organic components may be also used.

In the invention, in addition to the above constituents, within the range wherein the features and effects of the invention are not impaired, the other additional constituents, for example, an antioxidant, an elastomer (an olefinic copolymer such as ethylene/propylene copolymer, ethylene/1-butene copolymer, ethylene/propylene/non-conjugate diene copolymer, ethylene/ethyl acrylate copolymer, ethylene/glycidyl methacrylate copolymer, ethylene/vinyl acetate/glycidyl methacrylate copolymer and ethylene/propylene-g-maleic anhydride copolymer, or ABS, a polyester polyether elastomer, a polyester polyester elastomer, a vinyl aromatic compound-conjugate diene compound block copolymer, a hydrogenated product of a vinyl aromatic compound-conjugate diene compound block copolymer), a plasticizer (an oil, a low-molecular-weight polyethylene, an epoxidized soybean oil, polyethylene glycol, a fatty acid ester, etc.), a flame retardant aid, a weather (light) resistance improver, an agent for nucleation of polyolefin, a slip agent, various colorants, a releasing agent, and the like may be added, if necessary.

The resin composition of the invention can be produced by various methods. For example, a melt-kneading method under heating using a single-screw extruder, a twin-screw extruder, a roll, a kneader, a Brabender Plastograph, a Banbury mixer, or the like may be mentioned but among them, a melt-kneading method using a twin-screw extruder is most preferred. The melt-kneading temperature at that time is not particularly limited but usually, the temperature may be optionally selected from 150° C. to 380° C. depending on the purpose.

The resin composition of the invention thus obtained can be molded into molded articles of various parts by various methods hitherto known, for example, injection molding, extrusion molding, and blow molding. The polyphenylene ether-based resin composition of the invention exhibits a high melt flowability with hardly impairing the high heat resistance and excellent mechanical properties intrinsic to polyphenylene ether resins. Therefore, the polyphenylene ether-based resin composition of the invention is an industrially useful, novel material which can be melt-molded industrially extremely advantageously with a high productivity, the resulting molded article exhibiting extremely excellent properties. Namely, the polyphenylene ether-based resin composition of the invention enables a process for producing a polyphenylene ether-based resin molded article having excellent properties hitherto not known by a melt-molding process industrially advantageously.

The molded articles produced from the polyphenylene ether-based resin composition of the invention by a melt-molding process are suitable for applications where flame resistance and heat resistance are particularly required, for example, automobile heat-resistant parts or heat-resistant parts for office equipment. As the automobile heat resistant parts, the molded articles are suitable for an alternator terminal, an alternator connector, an IC regulator, a potentiometer base for lightdayer, various valves such as exhaust gas valves, various fuel, exhaust gas, and air intake pipes, an air intake nozzle snorkel, an intake manifold, a fuel pump, an engine coolant joint, a carburetor main body, a carburetor spacer, an exhaust gas sensor, a coolant sensor, an oil-temperature sensor, a brake pad wear sensor, a throttle position sensor, a crankshaft position sensor, an air flow meter, a brake pad abrasion sensor, a thermostat base for air conditioner, a warm-air-flow controlling valve, a brush holder for radiator motor, a water pump impeller, turbine vanes, wiper motor parts, a distributor, a starting switch, a starter relay, a wire harness for transmission, a window washer nozzle, an air-conditioner panel switch board, a coil for fuel electromagnetic valve, a fuse connector, a horn terminal, an electrical component-insulating board, a step motor rotor, a brake piston, a solenoid bobbin, an engine oil filter, parts such as an ignition device case, a wheel cap, a lamp socket, a lamp housing, a lamp extension, a lamp reflector, and the like. Of these, the molded articles are suitable for a lamp extension and a lamp reflector in view of the balance of lightness, heat resistance, flame resistance and mechanical properties. Moreover, with regard to the heat-resistant parts for office equipment, they are suitable for household and office electric appliance parts including air-conditioner parts, typewriter parts and word processor parts as representatives, office computer-related parts, telephone-related parts, facsimile-related parts, copying machine-related parts, and the like.

EXAMPLES

The following will describe the mode for carrying out the invention in detail with reference to Examples and Comparative Examples. The invention is not limited thereto.

Products of Hybrid Plastics Company were employed as the cage silsesquioxanes and/or partially cleaved structures of the cage silsesquioxanes used other than those whose Synthetic Examples were described in Examples and Comparative Examples.

Evaluation of physical properties of the resulting cage silsesquioxanes and partially cleaved structures of the cage silsesquioxanes was carried out in accordance with the following procedures.

(1) Evaluation of Mold Deposit (MD)

One thousand shots of a test piece having a size of 10×25×0.2 mm were molded and the degree of MD attachment on the mold surface was evaluated visually.

(2) Evaluation of Flame Resistance

As evaluation of flame resistance of Examples 4 to 7 and Comparative Examples 2 and 3, using five plate-like test pieces having a length of 126 mm, a width of 12.6 mm and a thickness of 500 μm, they were brought into contact with flame twice, the contact time with flame being 5 seconds. The combustion time required for extinction was measured in each case.

As evaluation of flame resistance of Examples 8 to 18 and 29 to 32 and Comparative Examples 4 to 5 and 10 to 11, using five plate-like test pieces having a length of 126 mm, a width of 12.6 mm and a thickness of 1/16 inch, evaluation on average combustion time, maximum combustion time and number of droppings was carried out in accordance with UL-94 (U.S.A. Underwriter Laboratory's Standard).

As evaluation of flame resistance of Examples 19 to 28 and Comparative Examples 6 to 9, using five plate-like test pieces having a length of 126 mm, a width of 12.6 mm and a thickness of 1.5 mm, evaluation on average combustion time, maximum combustion time and number of droppings was carried out in accordance with UL-94 (U.S.A. Underwriter Laboratory's Standard).

(3) Melt Flowability

In accordance with JIS K6730, melt index (MI) of mainly resin composition at 280° C. and a load of 10 kg was measured to evaluate a melt flow rate (MFR).

(4) Heat Resistance

The glass transition point (Tg) of a film having a length of 27 mm, a width of 3 mm and a thickness of 200 μm was evaluated using a vibron mfd. by Orientech.

(5) Tensile Strength

A tensile strength of a film having a length of 40 mm, a width of 10 mm and a thickness of 200 μm was evaluated using a tensile tester (model 1356) mfd. by AIKOH.

Example 1

Ninety-five percent by weight of poly(2,6-dimethyl-1,4-phenylene)ether dried at 150° C. for 4 hours and having a molecular weight (Mw) of 37100 and Mw/Mn of 2.06 and 5% by weight of octaisobutyloctasilsesquioxane (a compound of the general formula (4) wherein R is an isobutyl group) were premixed and then melt-kneaded in a Labo-plastomill (mfd. by Toyo Seiki) set at 300° C. for 10 minutes. The resulting resin composition was pressed on a heating press of maximum 100 kg set at 300° C. for 10 minutes and on a cooling press of maximum 100 kg set at 90° C. for 2 minutes to obtain a plate-like molded article of 200 μm.

When the resulting molded article was analyzed by $^1$H- and $^{29}$Si-NMR, peaks characteristic to octaisobutyloctasilsesquioxane ($^1$H: 1.87 ppm, 0.96 ppm, 0.62 ppm, $^{29}$Si: −64 ppm) were detected and thus it was confirmed that octaisobutyloctasilsesquioxane was not decomposed by heating. Moreover, by fluorescent X-ray (XRF), it was confirmed that octaisobutyloctasilsesquioxane was contained in the same amount as the amount charged.

Table 1 shows evaluation results of the resin composition.

Examples 2 and 3 and Comparative Example 1

In Examples 2 and 3, resin compositions were obtained in a similar manner to Example 1 with the exception that the kind and amount added of the cage silsesquioxane compound were changed, and then evaluated. The structures of the compounds were shown in Table 2. With regard to Comparative Example 1, a sole polyphenylene ether resin composition without a cage silicon compound was evaluated.

Table 1 shows evaluation results.

TABLE 1

| Example No. | Additive | Amount added | MFR (g/10 min) | Tg (° C.) | Tensile strength (Kg/mm$^2$) |
|---|---|---|---|---|---|
| Example 1 | Compound A | 5% by weight | 4.4 | 211 | 6.1 |
| Example 2 | Compound B* | 5% by weight | 6.8 | 212 | 6.2 |
| Example 3 | Compound B* | 2% by weight | 4.3 | 215 | 6.0 |
| Comparative Example 1 | No addition | | 2.4 | 217 | 6.3 |

*A mixture of cage silsesquioxanes having 8 to 12 silicone atoms

TABLE 2

| | Compound A | Compound B |
|---|---|---|
| Structure | 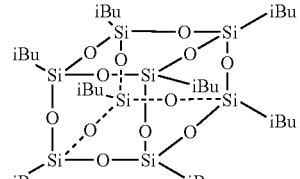 | 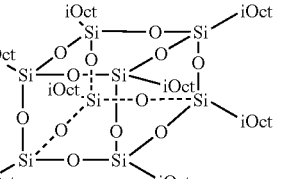 |

From Table 1, it is found that the polyphenylene ether-based resin compositions to which a cage silsesquioxane compound is incorporated improve melt flowability to a large extent while hardly decreasing heat resistance and tensile strength.

Examples 4 to 7 and Comparative Example 2

In Example 4, a resin composition was obtained in a similar manner to Example 1 with the exception that the amount of Compound A added was changed and a test piece having a length of 126 mm, a width of 12.6 mm and a thickness of 500 μm was prepared.

In Examples 5 and 7, resin compositions were obtained in a similar manner to Example 4 with the exception that the kind and amount added of the cage silsesquioxane compound were changed, and then evaluated. The structures of the compounds are shown in Table 4.

With regard to Comparative Example 2, a sole polyphenylene ether resin composition using no cage silicon compound was evaluated.

Comparative Example 3

To a glass vessel were added 100 parts of methyltriethoxysilane and 80 parts of toluene, and 50 parts of 1% by weight hydrochloric acid aqueous solution were added gradually thereto with stirring to effect hydrolysis of the silane. After completion of the addition, the liquid was separated to take out an organic phase. After washing with water, the solvent, toluene was removed to obtain polymethylsilsesquioxane containing a silanol group. The molecular weight of the resulting polymethylsilsesquioxane was found to be about 5000 (measured on GPC, in terms of polystyrene), and the content of the silanol group was about 5 mol % (NMR spectrum). A resin composition was obtained in a similar manner to Example 4 with the exception that the silicon compound was used, and then evaluated.

Table 3 shows evaluation results.

TABLE 3

| Example No. | Additive | Amount added (%) | Average combustion time (sec) | Maximum combustion time (sec) | Number of droppings (number) |
|---|---|---|---|---|---|
| Example 4 | Compound A | 10% by weight | 4.7 | 9.7 | 0/10 |
| Example 5 | Compound A | 5% by weight | 3.7 | 14.0 | 0/10 |

TABLE 3-continued

| Example No. | Additive | Amount added (%) | Average combustion time (sec) | Maximum combustion time (sec) | Number of droppings (number) |
|---|---|---|---|---|---|
| Example 6 | Compound C | 10% by weight | 5.6 | 10.5 | 0/10 |
| Example 7 | Compound D | 10% by weight | 5.9 | 11.3 | 0/10 |
| Compara. Example 2 | No addition | | 8.6 | 21.3 | 0/10 |
| Compara. Example 3 | Polymethylsilsesquioxane | 10% by weight | 7.9 | 15.8 | 2/10 |

TABLE 4

| | Compound A | Compound C | Compound D |
|---|---|---|---|
| Structure | 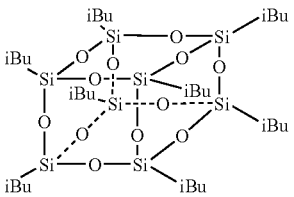 | 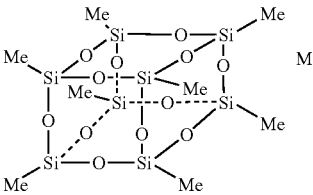 | 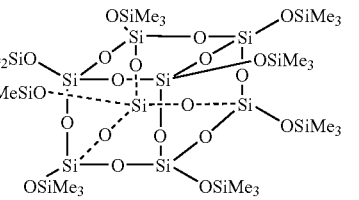 |

From Table 3, it is found that the polyphenylene ether-based resin compositions to which a cage silsesquioxane compound is added are excellent in flame resistance.

Example 8

Evaluation was further carried out with changing the process for producing compositions, the method for preparing test pieces, and the kind and amount to be added of the cage silsesquioxane or partially cleaved structure thereof.

Ninety-five percent by weight of poly(2,6-dimethyl-1,4-phenylene)ether dried at 150° C. for 4 hours and having a molecular weight (Mw) of 37100 and Mw/Mn of 2.06 and 5% by weight of heptaisobutyl-heptasilsesquioxane-trisilanol (a compound of the general formula (8) wherein R is an isobutyl group and X is a hydroxy group) were premixed, then charged into a twin-screw extruder (mfd. by Technobell, ZSW-15) set at 280° C., and melt-kneaded to obtain a polyphenylene ether-based resin composition. Pellets of the resulting resin composition were molded at an injection rate of 50 mm/sec using an injection molding machine (FANUC FAS-15A) set at a mold temperature of 90° C. with setting cylinder temperatures at 290/290/290/290° C. Table 5 shows evaluation results of the resulting composition.

Examples 9 to 15

Resin compositions were obtained in a similar manner to Example 8 with the exception that the kind and amount added of the cage silsesquioxane or partially cleaved structure of the cage silsesquioxane were changed, and were evaluated. The results were shown in Table 5 and the structure in Table 6.

Example 16

In a three-neck glass flask fitted with a reflux condenser and a dropping funnel, 21 parts by weight of heptaisobutyl-heptasilsesquioxane-trisilanol (a compound of the general formula (8) wherein R is iBu and X is OH) were dissolved in 20 parts by weight of THF and 100 parts by weight of ethanol, and a solution of 6 parts by weight of 3-aminopropyldiethoxymethylsilane dissolved in 20 parts by weight of ethanol was added dropwise thereto to effect hydrolysis. After completion of the addition, the mixture was heated to 60° C. and stirred for 6 hours, and then the solvents, THF and ethanol were removed by evaporation to obtain the desired product (Compound M). When the resulting partially cleaved structure of the cage silsesquioxane was analyzed by $^1$H- and $^{29}$Si-NMR, characteristic peaks ($^1$H: 0.09 ppm, 0.55 ppm, 0.95 ppm, 1.48 ppm, 1.84 ppm, 2.65 ppm, $^{29}$Si: −18.23 ppm, −58.59 ppm, −66.08 ppm, −67.53 ppm, −67.99 ppm) were obtained. Moreover, the resulting partially cleaved structure of the cage silsesquioxane was mixed with NBA and glycerol and the mixture was measured on FAB-MS (Positive) to result in m/z=891 [M+H]$^+$. A resin composition was obtained in a similar manner to Example 8 with the exception that the partially cleaved structure of the cage silsesquioxane was used, and was evaluated. Table 6 shows evaluation results.

Example 17

In a three-neck glass flask fitted with a reflux condenser and a dropping funnel, 21 parts by weight of heptaisobutyl-heptasilsesquioxane-trisilanol (a compound of the general formula (8) wherein R is iBu and X is OH) were dissolved in 20 parts by weight of THF and 100 parts by weight of ethanol, and a solution of 6 parts by weight of 2-ethyl(3-aminopropyl)dimethoxymethylsilane dissolved in 20 parts by weight of ethanol was added dropwise thereto to effect hydrolysis. After completion of the addition, the mixture was heated to 60° C. and stirred for 6 hours, and then the solvents, THF and ethanol were removed by evaporation to obtain the desired product (Compound N). When the resulting partially cleaved structure of the cage silsesquioxane was analyzed by $^1$H- and $^{29}$Si-NMR, characteristic peaks ($^1$H: 0.07 ppm, 0.58 ppm, 0.94 ppm, 1.56 ppm, 1.84 ppm, 2.63 ppm, 2.82 ppm, $^{29}$Si: −19.93 ppm, −59.30 ppm, −66.31 ppm, −67.10 ppm, −67.89 ppm) were obtained. Moreover, the resulting partially cleaved structure of the cage silsesquioxane was mixed with NBA and glycerol, and the mixture was measured on FAB-MS (Positive) to result in m/z=934 [M+H]$^+$.

A resin composition was obtained in a similar manner to Example 8 with the exception that the partially cleaved structure of the cage silsesquioxane was used, and was evaluated. Table 6 shows evaluation results.

Example 18

Evaluation was carried out using Compound A as an additive and melem.

Ninety-five percent by weight of poly(2,6-dimethyl-1,4-phenylene)ether dried at 150° C. for 4 hours and having a molecular weight (Mw) of 37100 and Mw/Mn of 2.06, 2.5% by weight of octaisobutyl-octasilsesquioxane (Compound A), and 2.5% by weight of melem were premixed, then charged into a twin-screw extruder (mfd. by Techno Bell, ZSW-15) set at 280° C., and melt-kneaded to obtain a polyphenylene ether-based resin composition. Pellets of the resulting resin composition were molded at an injection rate of 50 mm/sec using an injection molding machine (FANUC FAS-15A) set at a mold temperature of 90° C. with setting cylinder temperatures at 290/290/290/290° C. Table 5 shows evaluation results of the resulting composition.

Comparative Example 4

A sole polyphenylene ether-based resin composition was obtained in a similar manner to Example 8 with the exception that no cage silicon compound was used, and evaluation was carried out. Table 5 shows the results.

Comparative Example 5

A resin composition was obtained in a similar manner to Example 8 with the exception that amorphous polymethylsilsesquioxane obtained in Comparative Example 3 was used, and evaluation was carried out. Table 5 shows the results.

TABLE 5

| Example No. | Additive | Amount added (%) | MD evaluation | Flame-resistant test result (UL-94, 1/16') | | | MFR (g/10 min) |
| | | | | Average combustion time (sec) | Maximum combustion time (sec) | Number of droppings (n/10) | |
|---|---|---|---|---|---|---|---|
| Example 8 | Compound E | 5% by weight | ○ | 3.4 | 8.0 | 0/10 | 8.9 |
| Example 9 | Compound F | 5% by weight | ○ | 3.1 | 7.3 | 0/10 | 9.8 |
| Example 10 | Compound G | 5% by weight | ○ | 2.1 | 5.1 | 0/10 | 10.4 |
| Example 11 | Compound H | 2.5% by weight | ○ | 1.2 | 3.0 | 0/10 | 7.8 |
| Example 12 | Compound I | 5% by weight | ○ | 4.1 | 9.7 | 0/10 | 9.8 |
| Example 13 | Compound J | 5% by weight | ○ | 3.6 | 6.4 | 0/10 | 9.1 |
| Example 14 | Compound A | 5% by weight | ○ | 4.2 | 7.8 | 0/10 | 9.0 |
| Example 15 | Compound L | 5% by weight | ○ | 5.1 | 11 | 0/10 | 9.7 |
| Example 16 | Compound M | 5% by weight | ○ | 3.1 | 5.4 | 0/10 | 10.2 |
| Example 17 | Compound N | 5% by weight | ○ | 2.2 | 4.7 | 0/10 | 13.8 |
| Example 18 | Compound A | 2.5% by weight | ○ | 2.5 | 4.2 | 0/10 | 7.8 |
| | Melem | 2.5% by weight | | | | | |
| Comparative Example 4 | No addition | | ○ | 6.6 | 25 | 0/10 | 5.6 |
| Comparative Example 5 | Polymethylsilsesquioxane | 10% by weight | ○ | 7.6 | 22 | 2/10 | 4.5 |

TABLE 6

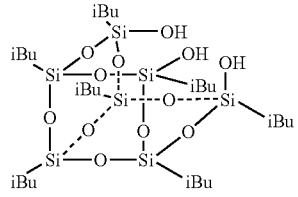

Compound E

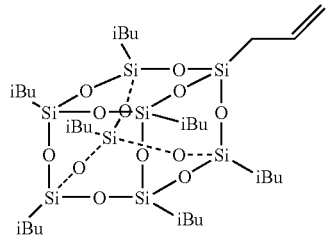

Compound F

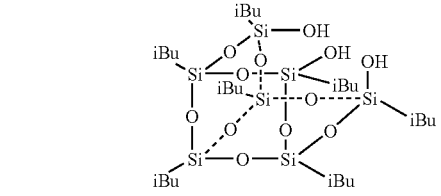

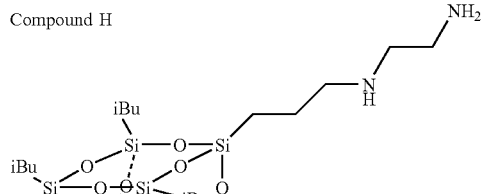

Compound H

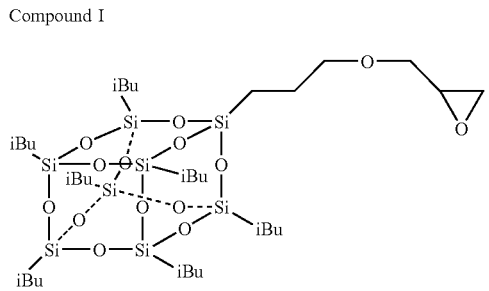

Compound I

TABLE 6-continued

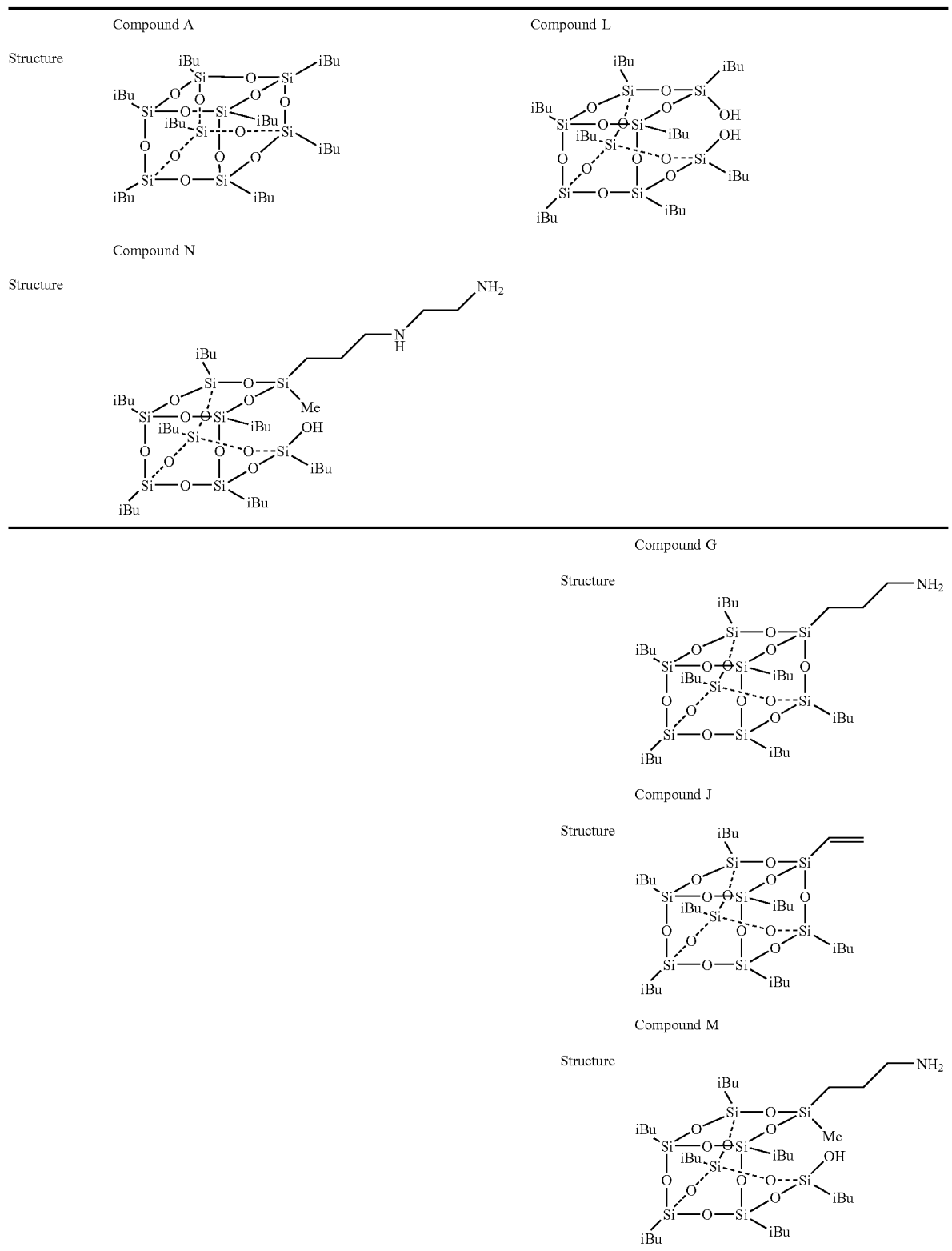

From Table 5, it is found that in the cage silsesquioxanes and/or the partially cleaved structure of the cage silsesquioxanes, a system incorporated with a group containing an unsaturated hydrocarbon bond or a group having a polar group containing at least one of a nitrogen atom and an oxygen atom and a cyclic nitrogen compound results in a small mold deposit and is more preferable in view of moldability and flame resistance.

Example 19

Ninety-five grams of poly(2,6-dimethyl-1,4-phenylene) ether dried at 150° C. for 4 hours and having a molecular weight (Mw) of 37100 and Mw/Mn of 2.06 and 5 g of heptaisobutyl-3-aminopropyl-octasilsesquioxane (Compound G) were premixed and the mixture was then charged into a Laboplastomill (mfd. by Toyo Seiki) set at 260° C. and melt-kneaded at 80 revolutions for 10 minutes to obtain a polyphenylene ether-based resin composition. A block of the resulting resin composition was subjected to press molding at 260° C. using a mold having a thickness of 1.5 mm. Table 7 shows evaluation results of the resulting composition.

Examples 20 and 21

Evaluation was carried out in a similar manner to Example 19 with the exception that the kind of the cage silsesquioxane was changed (Compound M). Table 7 shows evaluation results.

Example 22

In a three-neck glass flask fitted with a reflux condenser and a dropping funnel, 21 parts by weight of heptaisobutyl-heptasilsesquioxane-trisilanol (Compound E) were dissolved in 20 parts by weight of THF and 100 parts by weight of ethanol, and a solution of 12 parts by weight of 3-aminopropyldiethoxymethylsilane dissolved in 20 parts by weight of ethanol was added dropwise thereto to effect hydrolysis. After completion of the addition, the mixture was heated to 60° C. and stirred for 6 hours, and then the solvents, THF and ethanol were removed by evaporation to obtain the desired product (Compound 0). When the resulting partially cleaved structure of the cage silsesquioxane was analyzed by $^1$H- and $^{29}$Si-NMR, characteristic peaks ($^1$H: 0.10 ppm, 0.58 ppm, 0.94 ppm, 1.46 ppm, 1.64 ppm, 1.80 ppm, 2.64 ppm, 3.48 ppm, $^{29}$Si: −10.98 ppm, −18.06 ppm, −66.00 ppm, −67.03 ppm, −67.91 ppm) were obtained. Moreover, the resulting partially cleaved structure of the cage silsesquioxane was mixed with NBA and glycerol and the mixture was measured on FAB-MS (Positive) to result in m/z=1009 [M+H]$^+$.

A resin composition was obtained in a similar manner to Example 19 with the exception that the partially cleaved structure of the cage silsesquioxane was used, and was evaluated. Evaluation results are shown in Table 7 and structure in Table 8.

Example 23

In a three-neck glass flask fitted with a reflux condenser and a dropping funnel, 21 parts by weight of heptaisooctyl-heptasilsesquioxane-trisilanol (a compound of the general formula (8) wherein R is iOct and X is OH) were dissolved in 20 parts by weight of THF and 100 parts by weight of ethanol, and a solution of 6 parts by weight of 2-ethyl(3-aminopropyl)diethoxymethylsilane dissolved in 20 parts by weight of ethanol was added dropwise thereto to effect hydrolysis. After completion of the addition, the mixture was heated to 60° C. and stirred for 6 hours, and then the solvents, THF and ethanol were removed by evaporation to obtain the desired product (Compound P). When the resulting cage silsesquioxane was analyzed by $^1$H- and $^{29}$Si-NMR, characteristic peaks ($^1$H: 0.58 ppm, 0.77 ppm, 0.89 ppm, 1.00 ppm, 1.14 ppm, 1.30 ppm, 1.80 ppm, 2.02 ppm, 2.66 ppm, 2.80 ppm, $^{29}$Si: −67.25 ppm, −67.43 ppm, −67.56 ppm) were obtained. Moreover, the resulting partially cleaved structure of the cage silsesquioxane was mixed with NBA and glycerol and the mixture was measured on FAB-MS (Positive) to result in m/z=1311 [M+H]$^+$.

A resin composition was obtained in a similar manner to Example 19 with the exception that the cage silsesquioxane was used, and was evaluated. Evaluation results are shown in Table 7 and structure in Table 8.

Example 24

Evaluation was carried out in a similar manner to Example 19 with the exception that the kind of the cage silsesquioxane was changed (Compound Q). Evaluation results are shown in Table 7 and structure in Table 8.

Example 25

In a three-neck glass flask fitted with a reflux condenser and a dropping funnel, 20 parts by weight of heptaisobutyl-heptasilsesquioxane-trisilanol (Compound E) were dissolved in 70 parts by weight of THF, and 8 parts by weight of triethylamine was added. Then, 17 parts by weight of diphenylmethylchlorosilane were added dropwise thereto to effect a reaction. After completion of the addition, the mixture was stirred for 6 hours. After filtration of the precipitated salt through a filter, the solvent, THF was removed by evaporation to obtain the desired product (Compound R). When the resulting partially cleaved structure of the cage silsesquioxane was analyzed by $^1$H- and $^{29}$Si-NMR, characteristic peaks ($^1$H: 0.41 ppm, 0.48 ppm, 0.87 ppm, 0.94 ppm, 1.84 ppm, 7.28 ppm, 7.49 ppm, $^{29}$Si: −10.98 ppm, −10.43 ppm, −66.36 ppm) were obtained.

A resin composition was obtained in a similar manner to Example 19 with the exception that the partially cleaved structure of the cage silsesquioxanes was used, and was evaluated. Evaluation results are shown in Table 7 and structure in Table 8.

Example 26

In a three-neck glass flask fitted with a reflux condenser and a dropping funnel, 10 parts by weight of heptaphenyl-heptasilsesquioxane-trisilanol (a compound of the general formula (8) wherein R is Ph and X is OH) were dissolved in 40 parts by weight of THF and 40 parts by weight of ethanol, and 1 part by weight of triethylamine was added. Then, a solution of 2 parts by weight of isobutyltrimethoxysilane dissolved in 20 parts by weight of ethanol were added dropwise thereto to effect hydrolysis. After completion of the addition, the mixture was stirred for 6 hours, and then the solvents, THF and ethanol were removed by evaporation to obtain the desired product (Compound S). When the resulting cage silsesquioxane was analyzed by $^1$H- and $^{29}$Si-NMR, characteristic peaks ($^1$H: 0.58 ppm, 0.89 ppm, 1.80 ppm, 7.32 ppm, $^{29}$Si: −70.14 ppm, −75.82 ppm, −78.01 ppm) were obtained.

A resin composition was obtained in a similar manner to Example 19 with the exception that the cage silsesquioxane was used, and was evaluated. Evaluation results are shown in Table 7 and structure in Table 8.

Example 27

In a three-neck glass flask fitted with a reflux condenser and a dropping funnel, 10 parts by weight of heptaphenyl-heptasilsesquioxane-trisilanol (a compound of the general formula (8) wherein R is Ph and X is OH) were dissolved in 70 parts by weight of THF, and 4 parts by weight of triethylamine was added. Then, 3.5 parts by weight of trimethylchlorosilane were added dropwise thereto to effect a reaction. After completion of the addition, the mixture was stirred for 6 hours. After filtration of the precipitated salt through a filter, the solvent, THF was removed by evaporation to obtain the desired product (Compound T). When the resulting partially cleaved structure of the cage silsesquioxane was analyzed by $^1$H- and $^{29}$Si-NMR, characteristic peaks ($^1$H: 0.26 ppm, 6.86 ppm, 7.24 ppm, $^{29}$Si: 11.71 ppm, −77.19 ppm) were obtained.

A resin composition was obtained in a similar manner to Example 19 with the exception that the partially cleaved structure of the cage silsesquioxanes was used, and was evaluated. Evaluation results are shown in Table 7 and structure in Table 8.

Example 28

In a three-neck glass flask fitted with a reflux condenser and a dropping funnel, 10 parts by weight of heptaphenyl-heptasilsesquioxane-trisilanol (a compound of the general formula (8) wherein R is Ph and X is OH) was dissolved in 70 parts by weight of THF, and 4 parts by weight of triethylamine were added. Then, 5.5 parts by weight of dimethylphenylchlorosilane were added dropwise thereto to effect a reaction. After completion of the addition, the mixture was stirred for 6 hours. After filtration of the precipitated salt through a filter, the solvent, THF was removed by evaporation to obtain the desired product (Compound U). When the resulting partially cleaved structure of the cage silsesquioxane was analyzed by $^1$H- and $^{29}$Si-NMR, characteristic peaks ($^1$H: 0.04 ppm, 6.80 ppm, 7.05 ppm, $^{29}$Si: 0.93 ppm, −78.22 ppm) were obtained.

A resin composition was obtained in a similar manner to Example 19 with the exception that the partially cleaved structure of the cage silsesquioxane was used, and was evaluated. Evaluation results are shown in Table 7 and structure in Table 8.

Comparative Example 6

A sole polyphenylene ether-based resin composition was obtained in a similar manner to Example 19 with the exception that no cage silsesquioxane was used, and evaluation was carried out. Table 7 shows evaluation results.

Comparative Example 7

Evaluation was carried out in a similar manner to Example 19 with the exception that dimethylsiloxane (Shin-Etsu Chemical Co., Ltd KF-96, 20 cst) was used, and evaluation was carried out. Table 7 shows evaluation results.

Comparative Example 8

Evaluation was carried out in a similar manner to Example 19 with the exception that aminomethylsilicone (Shin-Etsu Chemical Co., Ltd KF-858) was used, and evaluation was carried out. Table 7 shows evaluation results.

Comparative Example 9

To a glass vessel were added 100 parts of phenyltrichlorosilane and 80 parts of toluene. With stirring, 50 parts of 1% by weight hydrochloric acid aqueous solution were gradually added thereto to effect hydrolysis of the silane. After completion of the addition, liquid separation was carried out to remove an organic phase. After washing with water, the solvent, toluene was removed by evaporation to obtain polyphenylsilsesquioxane containing a silanol group. The molecular weight of the resulting polyphenylsilsesquioxane was found to be about 2000 (measured on GPC, in terms of polystyrene), and the content of the silanol group was about 10 mol % (NMR spectrum). A resin composition was obtained in a similar manner to Example 19 with the exception that the silicon compound was used, and was evaluated. Table 7 shows evaluation results.

TABLE 7

| Example No. | Additive | Amount added (%) | Flame-resistant test result (UL-94, 1.5 mm) | | | MFR (g/10 min) |
| --- | --- | --- | --- | --- | --- | --- |
| | | | Average combustion time (sec) | Maximum combustion time (sec) | Number of droppings (n/10) | |
| Example 19 | Compound G | 5% by weight | 3.1 | 7.4 | 0/10 | 6.2 |
| Example 20 | Compound H | 5% by weight | 3.8 | 8.2 | 0/10 | 10.3 |
| Example 21 | Compound M | 5% by weight | 2.6 | 5.0 | 0/10 | 5.5 |
| Example 22 | Compound O | 5% by weight | 3.9 | 9.3 | 0/10 | 4.0 |
| Example 23 | Compound P | 5% by weight | 4.4 | 9.0 | 0/10 | 6.8 |
| Example 24 | Compound Q | 5% by weight | 4.0 | 9.2 | 0/10 | 4.8 |
| Example 25 | Compound R | 5% by weight | 3.4 | 6.0 | 0/10 | 4.9 |
| Example 26 | Compound S | 5% by weight | 4.0 | 9.1 | 0/10 | 3.4 |
| Example 27 | Compound T | 5% by weight | 3.0 | 8.5 | 0/10 | 3.9 |
| Example 28 | Compound U | 5% by weight | 4.2 | 8.7 | 0/10 | 3.9 |
| Compara. Example 6 | No addition | | 8.6 | 27.4 | 0/10 | 2.3 |
| Compara. Example 7 | Dimethylsiloxane (KF-96, 20Cst) | 5% by weight | 5.4 | 7.6 | 0/10 | 2.4 |
| Compara. Example 8 | Aminomethylsilicone (KF-858) | 5% by weight | 4.5 | 7.5 | 0/10 | 2.2 |
| Compara. Example 9 | Phenylsilsesquioxane | 5% by weight | 8.9 | 14.9 | 0/10 | 2.0 |

TABLE 6
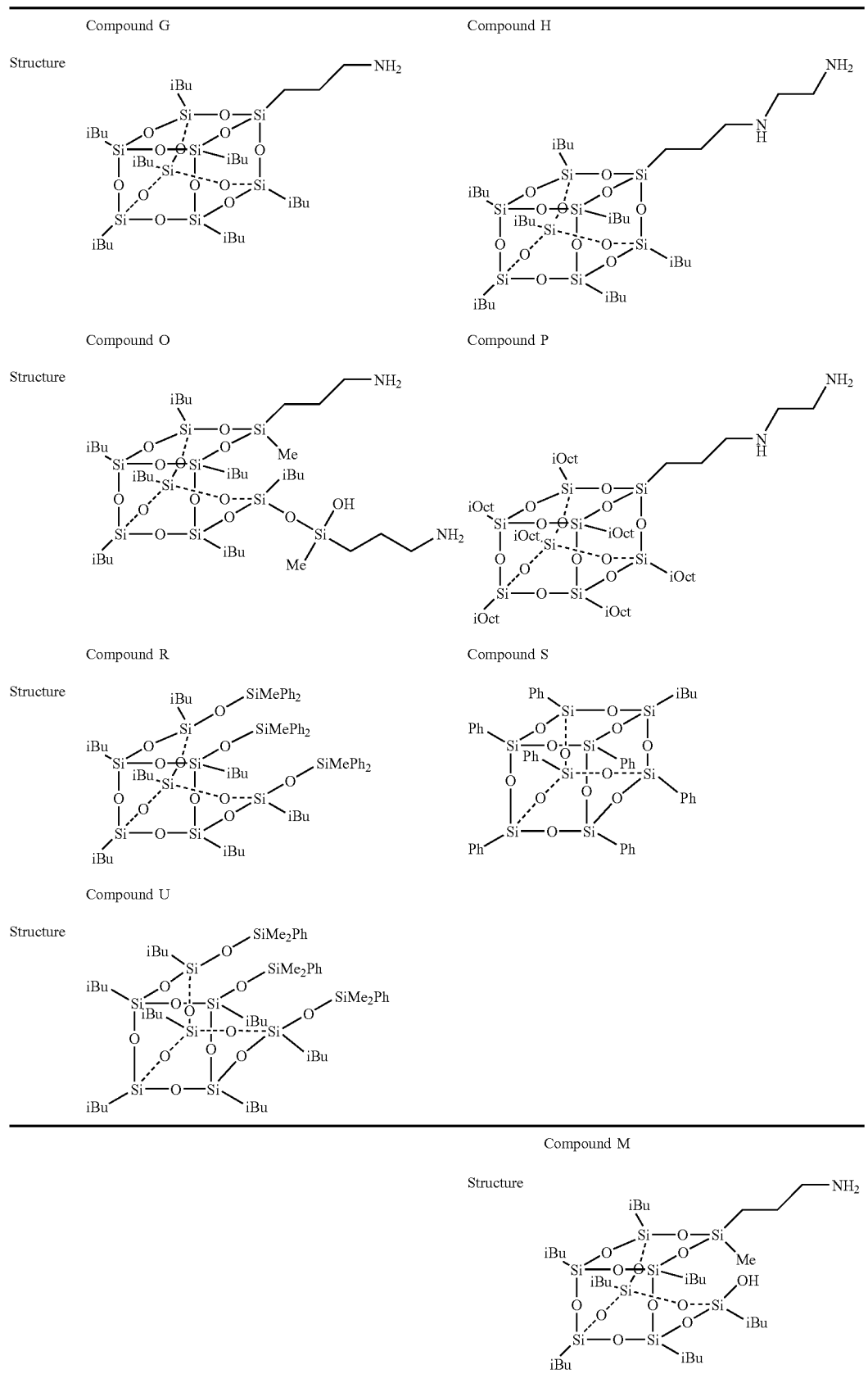

TABLE 6-continued

Compound Q

Structure

[Chemical structure of Compound Q: cage silsesquioxane with seven iOct groups and one aminopropyl group (–CH₂CH₂CH₂–NH₂)]

Compound T

[Chemical structure of Compound T: partially cleaved cage silsesquioxane with iBu groups and three SiMe₃ groups]

From Table 7, it is found that the cage silsesquioxanes and/or the partially cleaved structures of the cage silsesquioxanes have an enhanced moldability as compared with silicone oils. In addition, in the case that the ratio of the group having a polar group containing a nitrogen atom and/or an oxygen atom or the aromatic hydrocarbon group in R, X, Y, and Z of the cage silsesquioxanes and/or the partially cleaved structures of the cage silsesquioxanes is within 93%, the compositions are found to be excellent in moldability and flame resistance.

Example 29

Ninety percent by weight of poly(2,6-dimethyl-1,4-phenylene)ether dried at 150° C. for 4 hours and having a molecular weight (Mw) of 37100 and Mw/Mn of 2.06, 10 parts by weight of polystyrene (mfd. by Asahi Chemical Co., Ltd, GPPS 685) and 10% by weight of octaisobutyl-octasilsesquioxane [Compound A] were premixed, then charged into a twin-screw extruder (mfd. by Techno Bell, ZSW-15) set at 270° C., and melt-kneaded to obtain a polyphenylene ether-based resin composition. Pellets of the resulting resin composition were molded at an injection rate of 50 mm/sec using an injection molding machine (FANUC FAS-15A) set at a mold temperature of 90° C. with setting cylinder temperatures at 290/290/290/290° C. Table 9 shows evaluation results of the resulting composition.

Examples 30 to 32

Resin compositions were obtained in a similar manner to Example 29 with the exception that the kind and amount added of the cage silsesquioxane or partially cleaved structure of the cage silsesquioxane were changed, and were evaluated. The results were shown in Table 9 and the structure in Table 10.

Comparative Example 10

A sole polyphenylene ether-based resin composition was obtained in a similar manner to Example 29 with the exception that no cage silicon compound was used, and evaluation was carried out. Table 9 shows the results.

Comparative Example 11

A resin composition was obtained in a similar manner to Example 29 with the exception that amorphous polymethylsilsesquioxane obtained in Comparative Example 3 was used, and evaluation was carried out. Table 9 shows the results.

TABLE 9

| | | | | Flame-resistant test result (UL-94, 1/16') | | |
|---|---|---|---|---|---|---|
| Example No. | Additive | Amount added (%) | MD evaluation | Average combustion time (sec) | Maximum combustion time (sec) | Number of droppings (n/10) |
| Example 29 | Compound A | 10% by weight | ○ | 5.2 | 10.2 | 0/10 |
| Example 30 | Compound J | 10% by weight | ○ | 4.3 | 8.3 | 0/10 |
| Example 31 | Compound G | 10% by weight | ○ | 2.7 | 6.2 | 0/10 |

TABLE 9-continued

| Example No. | Additive | Amount added (%) | MD evaluation | Flame-resistant test result (UL-94, 1/16') | | |
|---|---|---|---|---|---|---|
| | | | | Average combustion time (sec) | Maximum combustion time (sec) | Number of droppings (n/10) |
| Example 32 | Compound H | 10% by weight | ○ | 2.5 | 5.6 | 0/10 |
| Compara. Example 10 | No addition | | ○ | 12.6 | 30 | 0/10 |
| Compara. Example 11 | Polymethylsilsesquioxane | 10% by weight | ○ | 10.3 | 29 | 2/10 |

TABLE 10

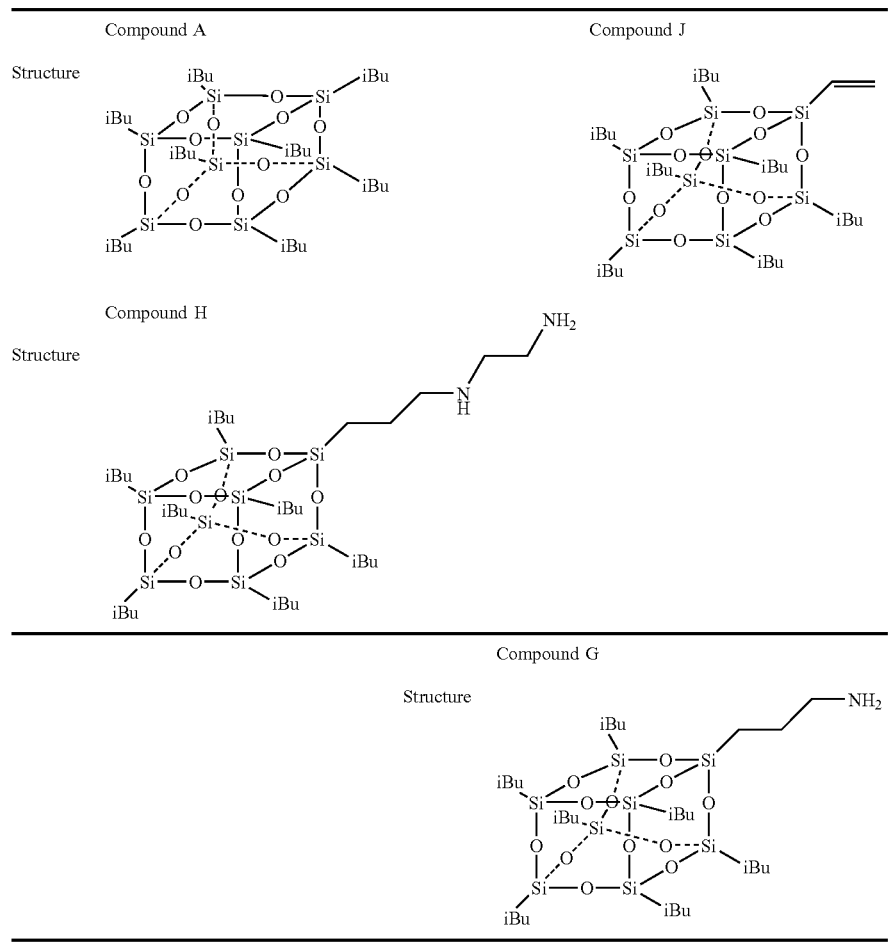

From Table 9, also in the case of polymer alloys of polyphenylene ether-styrene, the cage silsesquioxanes and/or the partially cleaved structures of the cage silsesquioxanes are excellent for moldability and flame resistance.

As is apparent from Tables 1 to 10, the polyphenylene ether-based resin compositions to which a specific cage silsesquioxane or partially cleaved structure of the cage silsesquioxane of the invention is incorporated are excellent in flame resistance.

While the invention has been described in detail and with reference to specific examples thereof, it will be apparent to one skilled in the art that various changes and modifications can be made therein without departing from the spirit and scope thereof.

The present application is based on Japanese Patent Application No. 2001-015237 filed on Jan. 24, 2001 and Japanese Patent Application No. 2001-289244 filed on Sep. 21, 2001, the contents thereof being incorporated herein by reference.

INDUSTRIAL APPLICABILITY

According to the present invention, the incorporation of a cage silsesquioxane and/or partially cleaved structure of the cage silsesquioxane to a polyphenylene ether-based resin composition affords a polyphenylene ether-based resin composition which is excellent in heat resistance, mechanical properties, moldability and flame resistance and also results in a small mold deposit. These are industrially useful.

The invention claimed is:

1. A polyphenylene ether-based resin composition comprising a polyphenylene ether-based resin and at least one member selected from the group consisting of a cage silsesquioxane and a partially cleaved structure of a cage silsesquioxane;

wherein the cage silsesquioxane is a compound represented by the general formula (A) and the partially cleaved structure of the cage silsesquioxane is a compound represented by the general formula (B):

$$[RSiO_{3/2}]_n \tag{A}$$

$$(RSiO_{3/2})_l(RXSiO)_k \tag{B}$$

wherein, in the general formulae (A) and (B), R is selected from a hydrogen atom, an alkoxyl group having 1 to 6 carbon atoms, an aryloxy group, a substituted or unsubstituted hydrocarbon group having 1 to 20 carbon atoms, and a silicon atom-containing group having 1 to 10 silicon atoms, and a plurality of R's may be the same or different; in the general formula (B), X is a group selected from $OR_1$ ($R_1$ is a hydrogen atom, an alkyl group, an aryl group, a quaternary ammonium radical), halogen atom and groups defined in the above R, and a plurality of X's may be the same or different or a plurality of X's in $(RXSiO)_k$ may be connected to each other to form a connected structure; and n is an integer of 6 to 14, l is an integer of 2 to 12, and k is 2 or 3; and wherein the connected structure in the general formula (B) is a connected structure represented by the general formula (1):

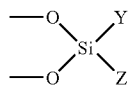

General formula (1)

wherein Y and Z are selected from the group consisting of the same groups as those for X, and Y and Z may be the same or different.

2. A polyphenylene ether-based resin composition comprising a polyphenylene ether-based resin and at least one member selected from the group consisting of a cage silsesquioxane and a partially cleaved structure of a cage silsesquioxane;

wherein the cage silsesquioxane is a compound represented by the general formula (A) and the partially cleaved structure of the cage silsesquioxane is a compound represented by the general formula (B):

$$[RSiO_{3/2}]_n \tag{A}$$

$$(RSiO_{3/2})_l(RXSiO)_k \tag{B}$$

wherein, in the general formulae (A) and (B), R is selected from a hydrogen atom, an alkoxyl group having 1 to 6 carbon atoms, an aryloxy group, a substituted or unsubstituted hydrocarbon group having 1 to 20 carbon atoms, and a silicon atom-containing group having 1 to 10 silicon atoms, and a plurality of R's may be the same or different; in the general formula (B), X is a group selected from $OR_1$ ($R_1$ is a hydrogen atom, an alkyl group, an aryl group, a quaternary ammonium radical), halogen atom and groups defined in the above R, and a plurality of X's may be the same or different or a plurality of X's in $(RXSiO)_k$ may be connected to each other to form a connected structure; and n is an integer of 6 to 14, l is an integer of 2 to 12, and k is 2 or 3; and wherein at least one member selected from the group consisting of R, X, Y, and Z in the general formulae (A) and (B) is 1) a group containing an unsaturated hydrocarbon bond or 2) a group having a polar group containing at least one member selected from the group consisting of a nitrogen atom and an oxygen atom.

3. The polyphenylene ether-based resin composition according to claim 1, wherein the compounds of the general formulae (A) and (B) have a ratio of "the number of R, X, Y, and Z which are aromatic hydrocarbon groups" to "the number of all of R, X, Y, and Z" of 93% or less.

4. The polyphenylene ether-based resin composition according to claim 1, wherein at least one of R, X, Y, and Z in the general formulae (A) and (B) is 1) a group containing an unsaturated hydrocarbon bond or 2) a group having a polar group containing at least one member selected from the group consisting of a nitrogen atom and an oxygen atom.

5. A polyphenylene ether-based resin composition comprising a polyphenylene ether-based resin and at least one member selected from the group consisting of a cage silsesquioxane and a partially cleaved structure of a cage silsesquioxane;

wherein the cage silsesquioxane is a compound represented by the general formula (A) and the partially cleaved structure of the cage silsesquioxane is a compound represented by the general formula (B):

$$[RSiO_{3/2}]_n \tag{A}$$

$$(RSiO_{3/2})_l(RXSiO)_k \tag{B}$$

wherein, in the general formulae (A) and (B), R is selected from a hydrogen atom, an alkoxyl group having 1 to 6 carbon atoms, an aryloxy group, a substituted or unsubstituted hydrocarbon group having 1 to 20 carbon atoms, and a silicon atom-containing group having 1 to 10 silicon atoms, and a plurality of R's may be the same or different; in the general formula (B), X is a group selected from $OR_1$ ($R_1$ is a hydrogen atom, an alkyl group, an aryl group, a quaternary ammonium radical), halogen atom and groups defined in the above R, and a plurality of X's may be the same or different or a plurality of X's in $(RXSiO)_k$ may be connected to each other to form a connected structure; and n is an integer of 6 to 14, l is an integer of 2 to 12, and k is 2 or 3;

wherein the compounds of the general formulae (A) and (B) have a ratio of "the number of R, X, Y, and Z which are aromatic hydrocarbon groups" to "the number of all of R, X, Y, and Z" of 93% or less; and wherein at least one member selected from the group consisting of R, X, Y, and Z in the general formulae (A) and (B) is 1) a group containing an unsaturated hydrocarbon bond or 2) a group having a polar group containing at least one of a nitrogen atom and an oxygen atom.

6. The polyphenylene ether-based resin composition according to claim 3, wherein at least one member selected from the group consisting of R, X, Y, and Z in the general formulae (A) and (B) is 1) a group containing an unsaturated hydrocarbon bond or 2) a group having a polar group containing at least one of a nitrogen atom and an oxygen atom.

7. A polyphenylene ether-based resin composition comprising a polyphenylene ether-based resin and at least one member selected from the group consisting of a cage silsesquioxane and a partially cleaved structure of a cage silsesquioxane;

wherein the cage silsesquioxane is a compound represented by the general formula (A) and the partially cleaved structure of the cage silsesquioxane is a compound represented by the general formula (B):

$$[RSiO_{3/2}]_n \quad (A)$$

$$(RSiO_{3/2})_l(RXSiO)_k \quad (B)$$

wherein, in the general formulae (A) and (B), R is selected from a hydrogen atom, an alkoxyl group having 1 to 6 carbon atoms, an aryloxy group, a substituted or unsubstituted hydrocarbon group having 1 to 20 carbon atoms, and a silicon atom-containing group having 1 to 10 silicon atoms, and a plurality of R's may be the same or different; in the general formula (B), X is a group selected from $OR_1$ ($R_1$ is a hydrogen atom, an alkyl group, an aryl group, a quaternary ammonium radical), halogen atom and groups defined in the above R, and a plurality of X's may be the same or different or a plurality of X's in $(RSiO)_k$ may be connected to each other to form a connected structure; and n is an integer of 6 to 14, l is an integer of 2 to 12, and k is 2 or 3; and wherein the compound of the general formula (B) is a compound represented by the following general formula (B-1):

$$(RSiO_{3/2})_l(Rx_{a1}SiO)(Rx_{a2}SiO)(Rx_bSiO) \quad (B-1)$$

wherein, in the general formula (B-1), R and l are the same as in the case of the general formula (B); $X_{a1}$ and $X_{a2}$ are selected from the group consisting of the same groups as those for X in the general formula (B) and $X_{a1}$ and $X_{a2}$ may be connected to each other to form a connected structure represented by the general formula (1-1):

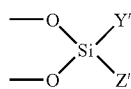

General formula (1-1)

wherein $X_b$ is a group selected from the group consisting of a hydroxyl group and $-OSi(OH)Y''Z''$; Y', Z', Y'' and Z'' are selected from the group consisting of the same groups as those for X in the general formula (B); provided that at least one of the members selected from the group consisting of $X_{a1}$, $X_{a2}$, $X_b$, Y', Z', Y'' and Z'' in the same compound is 1) a group containing an unsaturated hydrocarbon bond or 2) a group having a polar group containing a nitrogen atom and/or an oxygen atom and $X_{a1}$, $X_{a2}$, $X_b$, Y', Z', Y'' and Z'' may be the same or different from each other.

8. The polyphenylene ether-based resin composition according to claim 7 wherein at least one member selected from the group consisting of $X_{a1}$, $X_{a2}$, $X_b$, Y', Z', Y'' and Z'' in the compound of the general formula (B-1) is a group containing an amino group.

9. A compound represented by the following general formula (B-1):

$$(RSiO_{3/2})_l(RX_{a1}SiO)(RX_{a2}SiO)(RX_bSiO) \quad (B-1)$$

wherein, in the general formula (B-1), R is a member selected from the group consisting of a hydrogen atom, an alkoxyl group having 1 to 6 carbon atoms, an aryloxy group, a substituted or unsubstituted hydrocarbon group having 1 to 20 carbon atoms, and a silicon atom-containing group having 1 to 10 silicon atoms, and a plurality of R's may be the same or different; l is an integer of 2 to 12; $X_{a1}$ and $X_{a2}$ are each independently selected from the group consisting of $OR_1$ ($R_1$ is a hydrogen atom, an alkyl group, an aryl group, a quaternary ammonium radical), halogen atom and groups defined in the above R, and a plurality of $X_{a1}$'s may be the same or different, and a plurality of $X_{a2}$'s may be the same or different, and $X_{a1}$ and $X_{a2}$ may be connected to each other to form a connected structure represented by the general formula (1-1):

General formula (1-1)

wherein $X_b$ is a radical selected from the group consisting of a hydroxyl group and $-OSi(OH)Y''Z''$; Y', Z', Y'' and Z'' each is a group selected from $OR_1$ ($R_1$ is a hydrogen atom, an alkyl group, an aryl group, a quaternary ammonium radical), halogen atom and groups defined in the above R; provided that at least one of $X_{a1}$, $X_{a2}$, $X_b$, Y', Z', Y'' and Z'' in the same compound is a group having a polar group containing an amino group and $X_{a1}$, $X_{a2}$, $X_b$, Y', Z', Y'' and Z'' are the same or different from each other.

10. The polyphenylene ether-based resin composition according to any one of claims 1, 2, 3, 4, 5, 6, 7 and 8, wherein the content of the cage silsesquioxane and the partially cleaved structure of the cage silsesquioxane is from 0.1% by weight to 90% by weight in total.

11. The polyphenylene ether-based resin composition according to claim 10, wherein the polyphenylene ether-based resin is composed solely of a polyphenylene ether resin.

12. The polyphenylene ether-based resin composition according to claim 10, wherein the polyphenylene ether-based resin is a polymer alloy of a polyphenylene ether resin and at least one other resin.

13. The polyphenylene ether-based resin composition according to claim 12, wherein the polyphenylene ether-based resin is a polymer alloy containing a polyphenylene ether resin and at least one resin selected from a polystyrene-based resin, a polyamide-based resin, a polyester-based resin, a polyolefin-based resin, and a polyether sulfone-based resin.

14. The polyphenylene ether-based resin composition according to claim 12, wherein the content of the polyphenylene ether resin in the polymer alloy is 40% by weight or more.

15. The polyphenylene ether-based resin composition according to any one of claims 1, 2, 3, 4, 5, 6, 7 and 8, which further contains a cyclic nitrogen compound.

16. A process for producing a molded article of a polyphenylene ether-based resin composition, comprising melt-molding a polyphenylene ether-based resin composition according to any one of claims 1, 2, 3, 4, 5, 6, 7 and 8.

17. A process for producing a molded article of a polyphenylene ether-based resin composition, comprising meltmolding a polyphenylene ether-based resin composition according to claims 11.

18. A process for producing a molded article of a polyphenylene ether-based resin composition, comprising melt-molding a polyphenylene ether-based resin composition according to claim 12.

19. A process for producing a molded article of a polyphenylene ether-based resin composition, comprising melt-molding a polyphenylene ether-based resin composition according to claim 13.

20. A molded article of the polyphenylene ether-based resin composition according to any one of claims 1, 2, 3, 4, 5, 6, 7 and 8.

21. A molded article of the polyphenylene ether-based resin composition according to claim 11.

22. A molded article of the polyphenylene ether-based resin composition according to claim 12.

23. A molded article of the polyphenylene ether-based resin composition according to claim 13.

24. A process for producing a molded article of a polyphenylene ether-based resin composition, comprising melt-molding a polyphenylene ether-based resin composition according to claim 10.

25. A molded article of the polyphenylene ether-based resin composition according to claim 10.

26. A polyphenylene ether-based resin composition comprising a polyphenylene ether-based resin and at least one member selected from the group consisting of a cage silsesquioxane and a partially cleaved structure of a cage silsesquioxane and further comprising a cyclic nitrogen compound.

27. A process for producing a molded article of a polyphenylene ether-based resin composition, comprising melt-molding a polyphenylene ether-based resin composition comprising a polyphenylene ether-based resin and at least one member selected from the group consisting of a cage silsesquioxane and a partially cleaved structure of a cage silsesquioxane.

28. A molded article of the polyphenylene ether-based resin composition comprising a polyphenylene ether-based resin and at least one member selected from the group consisting of a cage silsesquioxane and a partially cleaved structure of a cage silsesquioxane.

* * * * *